(12) United States Patent
Hokimoto

(10) Patent No.: US 8,327,811 B2
(45) Date of Patent: Dec. 11, 2012

(54) ROTARY WORKING MACHINE

(75) Inventor: Kazuya Hokimoto, Chikugo (JP)

(73) Assignee: Yanmar Co., Ltd., Osaka (JP)

( * ) Notice: Subject to any disclaimer, the term of this patent is extended or adjusted under 35 U.S.C. 154(b) by 1126 days.

(21) Appl. No.: 11/994,793

(22) PCT Filed: Jan. 19, 2006

(86) PCT No.: PCT/JP2006/300735
§ 371 (c)(1),
(2), (4) Date: May 7, 2008

(87) PCT Pub. No.: WO2007/004329
PCT Pub. Date: Jan. 11, 2007

(65) Prior Publication Data
US 2010/0126440 A1    May 27, 2010

(30) Foreign Application Priority Data
Jul. 5, 2005    (JP) .................. 2005-196828

(51) Int. Cl.
*F01P 7/02*        (2006.01)
*E06B 7/08*        (2006.01)
(52) U.S. Cl. ..................... 123/41.04; 49/74.1
(58) Field of Classification Search ............... 123/41.04, 123/41.06, 41.49
See application file for complete search history.

(56) References Cited

U.S. PATENT DOCUMENTS

| | | | | |
|---|---|---|---|---|
| 957,776 A * | 5/1910 | Ilg | ................... | 417/316 |
| 1,220,794 A * | 3/1917 | Stepherson | ................ | 165/98 |
| 1,257,218 A * | 2/1918 | Griswold | ................ | 123/41.58 |
| 1,257,219 A * | 2/1918 | Griswold | ................ | 123/41.58 |
| 1,352,509 A * | 9/1920 | Griswold | ................ | 123/41.04 |
| 1,528,575 A * | 3/1925 | Schill | ................ | 165/41 |
| 1,542,407 A * | 6/1925 | Raleigh | ................ | 236/35.2 |
| 1,573,641 A * | 2/1926 | Hunt | ................ | 123/41.04 |
| 1,649,246 A * | 11/1927 | Morrisey | ................ | 123/41.42 |
| 2,357,137 A * | 8/1944 | Schneider | ................ | 49/86.1 |
| 2,551,921 A * | 5/1951 | Arsem | ................ | 123/41.04 |

(Continued)

FOREIGN PATENT DOCUMENTS

DE    2359388 A1    11/1973

(Continued)

OTHER PUBLICATIONS

Patent Abstracts of Japan, English language abstract for Publication No. JP 2004-352089, Slewing Working Machine, published Dec. 16, 2004.

(Continued)

*Primary Examiner* — M. McMahon
*Assistant Examiner* — Tea Bajramovic
(74) *Attorney, Agent, or Firm* — Sterne, Kessler, Goldstein & Fox P.L.L.C.

(57) ABSTRACT

When a cooling airflow used for cooling an engine etc. is discharged to a side of a machine as a discharge airflow, the airflow can be prevented from blowing to trees located at the side of the machine and to walkers passing the side of the machine. A rotary working machine has, inside a bonnet (10), an engine (8) and a discharge type cooling fan (45). An opening (10*b*) for discharging cooling airflow is provided in a side of the bonnet (10), and a movable louver (50) having blades (52, 52, . . . ) is provided in a duct (48) placed between the opening (10*b*) and the cooling fan (45).

2 Claims, 26 Drawing Sheets

U.S. PATENT DOCUMENTS

| | | | |
|---|---|---|---|
| 3,226,025 A | 12/1965 | Ferris | |
| 4,160,487 A * | 7/1979 | Kunze et al. | 180/68.4 |
| 4,339,014 A * | 7/1982 | Berth et al. | 180/68.1 |
| 4,457,558 A * | 7/1984 | Ishikawa | 296/180.5 |
| 4,753,288 A * | 6/1988 | Harvey | 165/98 |
| 6,435,264 B1 * | 8/2002 | Konno et al. | 165/41 |
| 6,527,333 B2 * | 3/2003 | Hewitt et al. | 296/180.1 |
| 6,922,925 B2 * | 8/2005 | Watanabe et al. | 37/466 |
| 7,066,245 B2 * | 6/2006 | Ebara et al. | 165/202 |
| 7,134,518 B2 * | 11/2006 | Arai et al. | 180/68.1 |
| 7,182,164 B2 * | 2/2007 | Merlo | 180/68.1 |
| 7,228,823 B2 * | 6/2007 | Lee | 123/41.49 |
| 7,481,289 B2 * | 1/2009 | Ueda et al. | 180/89.16 |
| 7,503,419 B2 * | 3/2009 | Miyake | 180/327 |
| 7,753,152 B2 * | 7/2010 | Nakae et al. | 180/68.1 |
| 7,836,967 B2 * | 11/2010 | Daniel et al. | 172/781 |
| 2004/0068978 A1 * | 4/2004 | Lair et al. | 60/226.2 |
| 2008/0202451 A1 * | 8/2008 | Taniuchi et al. | 123/41.15 |
| 2009/0199792 A1 * | 8/2009 | Kondou et al. | 123/41.49 |
| 2010/0071978 A1 * | 3/2010 | Kisse | 180/68.2 |
| 2010/0083917 A1 * | 4/2010 | Saida et al. | 123/41.04 |

FOREIGN PATENT DOCUMENTS

| | | | |
|---|---|---|---|
| FR | 2 821 817 A3 | | 9/2002 |
| JP | 59-107925 | | 7/1984 |
| JP | 59-163525 | | 11/1984 |
| JP | 60-113221 | | 7/1985 |
| JP | 63-270230 | | 11/1988 |
| JP | 64 001150 | | 1/1989 |
| JP | 2003-312243 | | 11/2003 |
| JP | 2004-352089 | | 12/2004 |
| JP | 2004352089 A | * | 12/2004 |
| KR | 10-1997-0065061 A | | 10/1997 |
| KR | 20-0381387 | | 4/2005 |

OTHER PUBLICATIONS

International Search Report for International Application No. PCT/JP2006/300735, Japanese Patent Office, mailed Mar. 14, 2006, 2 pgs.

Extended European Search Report for EP Appl. No. 06711981.8, mailed Dec. 13, 2011, European Patent Office, 5 pages.

* cited by examiner

ROTARY WORKING MACHINE

TECHNICAL FIELD

The present invention relates to an airflow discharging structure arranged in a bonnet of a rotary working machine.

BACKGROUND ART

Conventionally, in a rotary working machine such as a power shovel, a rotation table frame is generally arranged on a traveling device; a working machine including a boom and arm as well as an attachment such as a bucket is supported in a front and back rotatable manner at the front part of the rotation table frame; and an engine, a radiator, and the like are arranged at the rear part of the rotation table frame while being covered by the bonnet.

A cooling fan and a radiator are arranged on the side of the engine in the bonnet where the cooling airflow produced by the cooling fan cools the engine and thereafter passes through the radiator as discharge airflow and is discharged to the side of the main equipment through an opening formed on the side surface of the bonnet. An airflow direction plate is arranged in the opening or in a duct arranged between the radiator and the opening so that the airflow direction of the discharge airflow can be changed in the up and down direction (see e.g., Patent Document 1).

However, in the rotary working machine in the prior art, since the airflow direction of the discharge airflow discharged from the opening on the side surface of the bonnet is fixed in a constant up and down direction, the discharge airflow that has become hot airflow might blow against trees positioned to the side of the main equipment or on walkers walking near the side of the main equipment depending on the situation of the working place. Furthermore, a drawback in that the discharge airflow blows against the operator himself/herself who is on the main equipment may arise due to change in the airflow direction.

[Patent Document 1] Japanese Laid-Open Patent Publication No. 2004-352089

DISCLOSURE OF THE INVENTION

Problem to be Solved by the Invention

The problem to be solved is to prevent the cooling airflow from after cooling the engine etc. from blowing against trees positioned to the side of the main equipment or on walkers walking past the side of the main equipment when the air is being discharged to the side of the main equipment as discharge airflow.

Means for Solving the Problem

A rotary working machine of the present invention relates to a rotary working machine including an engine and a discharge type cooling fan in a bonnet; an opening for discharging a cooling airflow is formed at a side surface of the bonnet; and a movable louver having blades is arranged in a duct arranged between the opening and the cooling fan.

In the rotary working machine of the present invention, each side of the blades of the louver is connected with a movable lever; and one end of the lever is extended to the upper side of the duct.

In the rotary working machine of the present invention, one end of the lever is fixed to the side surface of the duct by a position fixing member through a long hole of a circular arc shape formed on the side surface of the duct.

In the rotary working machine of the present invention, the position fixing member is arranged in the vicinity of a cover for opening the upper side of the bonnet.

Effect of the Invention

In the rotary working machine of the present invention, since an opening for discharging a cooling airflow is formed at a side surface of the bonnet and a movable louver having blades is arranged in a duct arranged between the opening and the cooling fan in a rotary working machine including an engine and a discharge type cooling fan in a bonnet, the discharge airflow from the bonnet can be caused to flow in an arbitrary direction. Thus, the discharge airflow that has become hot airflow can be prevented from hitting the operator on the drive operation unit, trees on the side of the main equipment, and the like.

In the rotary working machine of the present invention, since each side of the blades of the louver is connected with a movable lever, and one end of the lever is extended to the upper side of the duct, the lever can be operated from the upper side of the duct, and thus the blades can be easily turned to adjust the airflow direction. In the rotary working machine of the present invention, since one end of the lever is fixed to the side of the duct by a position fixing member through a long hole of a circular arc shape formed on the side surface of the duct, the turning angle of each blade can be easily changed and the position can be fixed. In the rotary working machine of the present invention, since the position fixing member is arranged in the vicinity of a cover for opening the upper side of the bonnet, the turning angle of each blade can be rapidly changed, and the airflow direction of the discharge airflow can be easily adjusted by the louver.

DETAILED DESCRIPTION OF THE INVENTION

Figure 1:
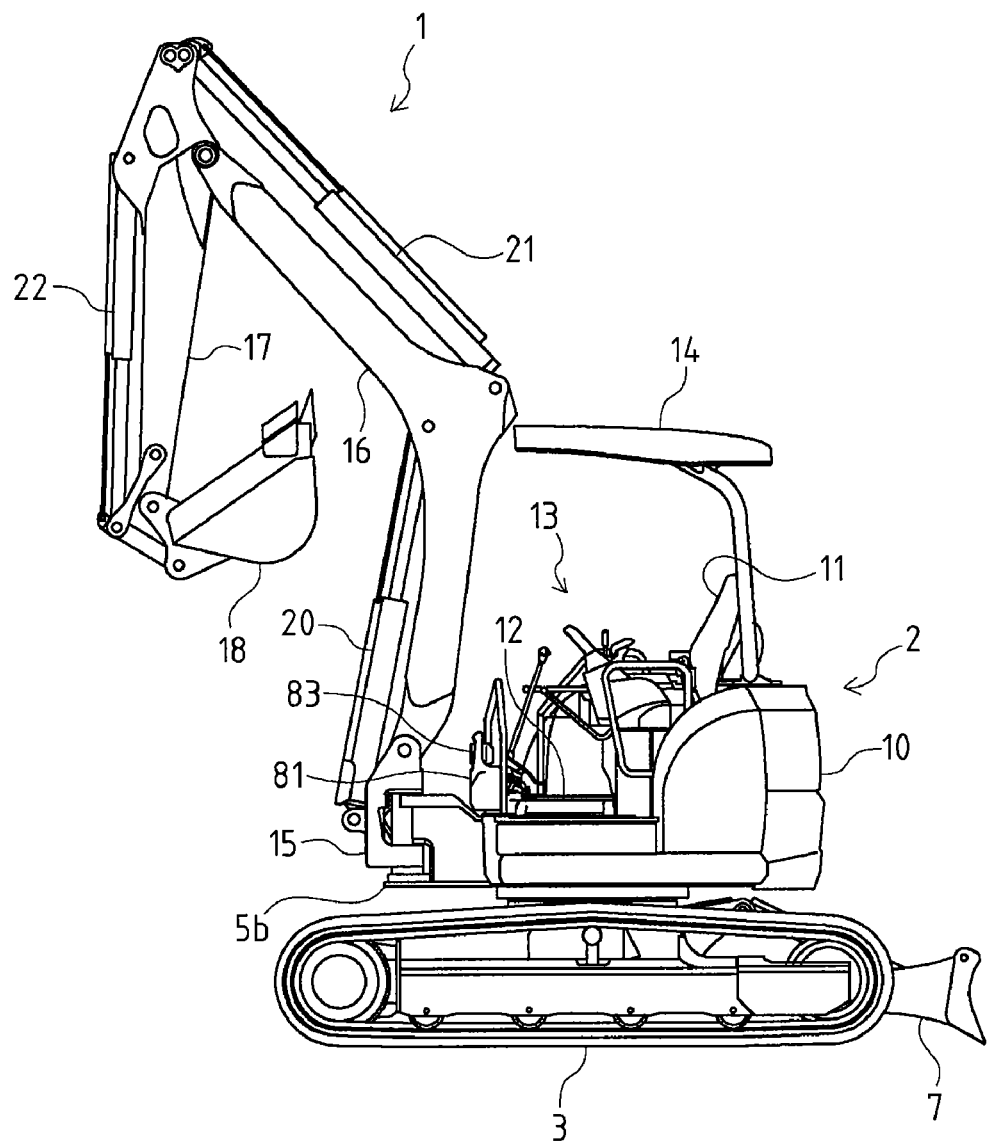
FIG. 1 is a left side view of a rear ultraminiature rotary type rotary working machine according to one example of the present invention.
Figure 2:
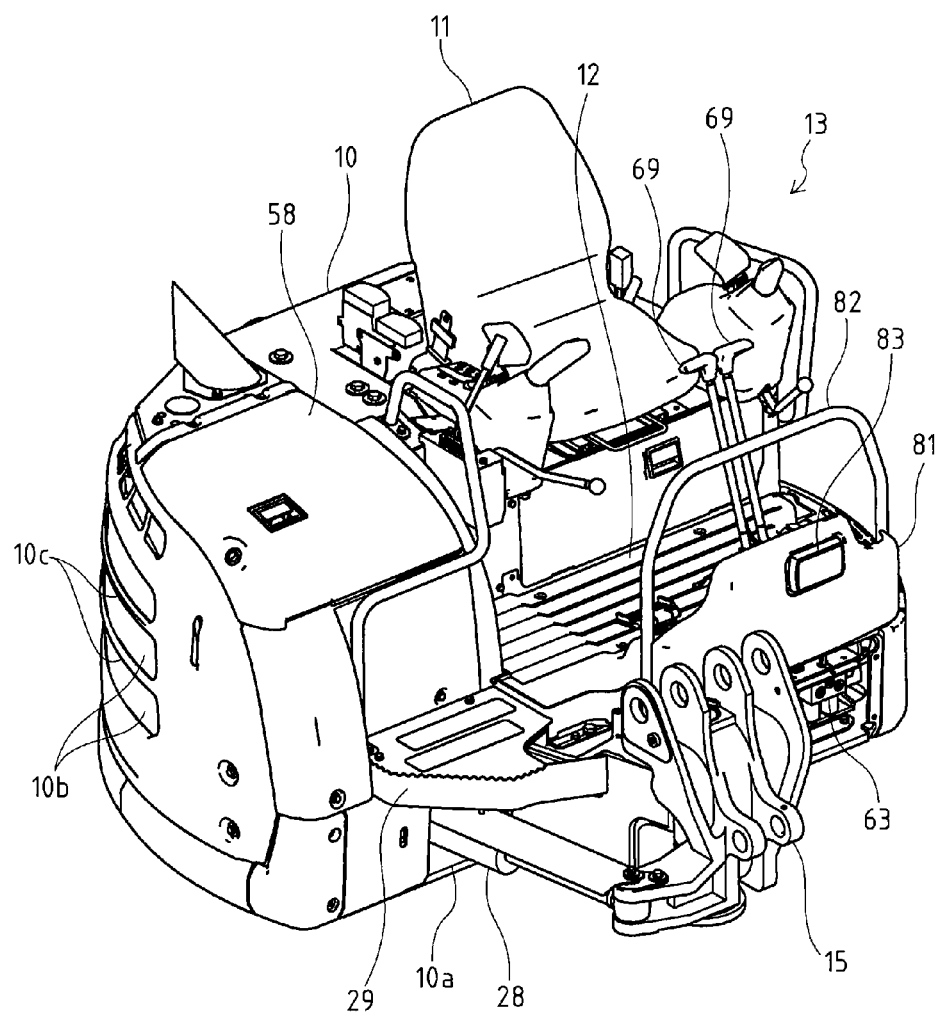
FIG. 2 is a perspective view of the main equipment of the rotary working machine.
Figure 3:
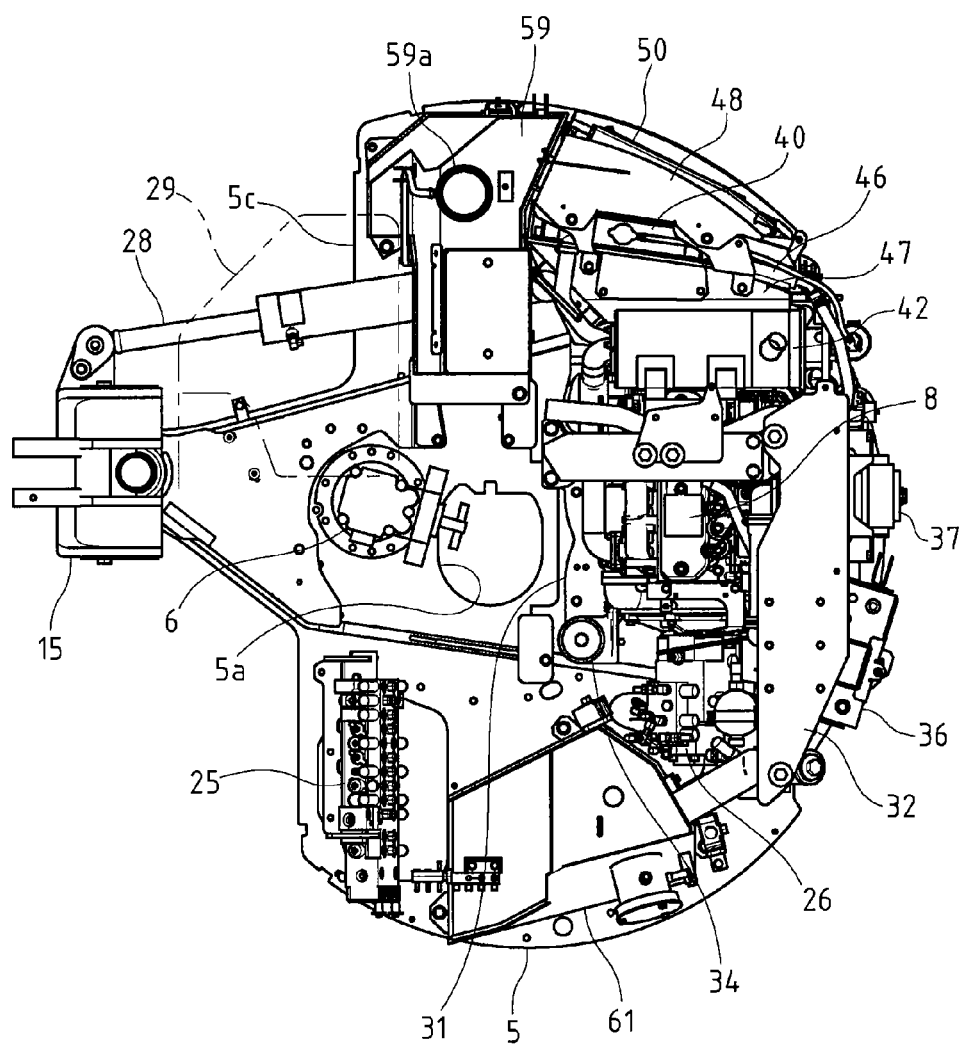
FIG. 3 is a plan view showing an arrangement structure of a rotation table frame.
Figure 4:
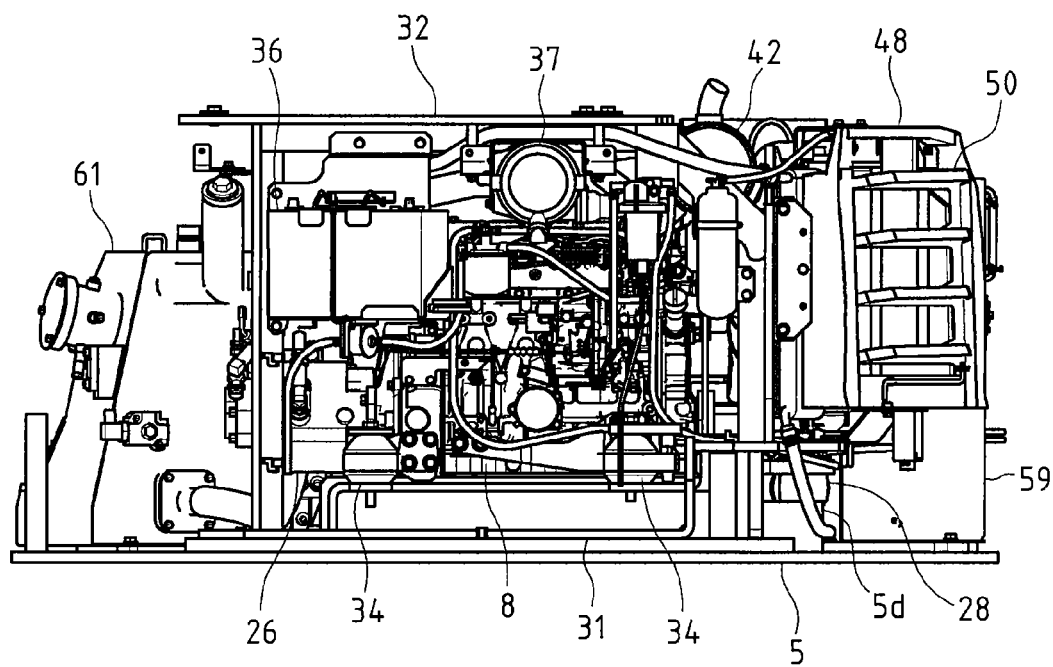
FIG. 4 is a rear view showing an arrangement structure of the rotation table frame.
Figure 5:
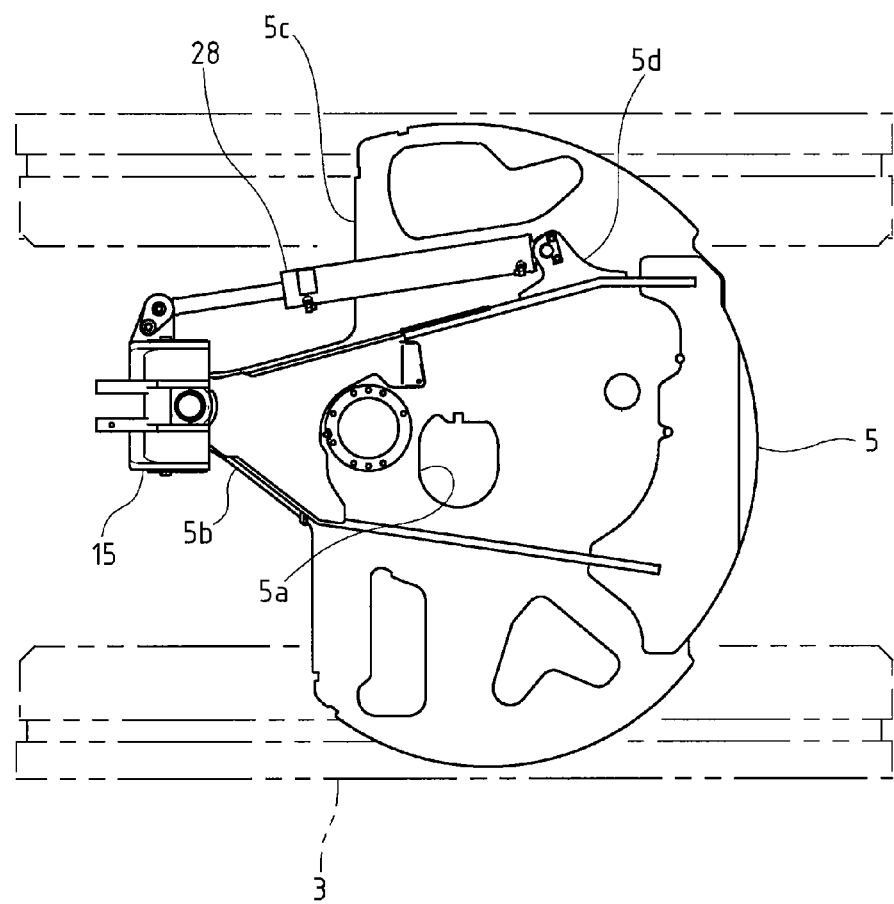
FIG. 5 is a plan view of the rotation table frame.
Figure 6:
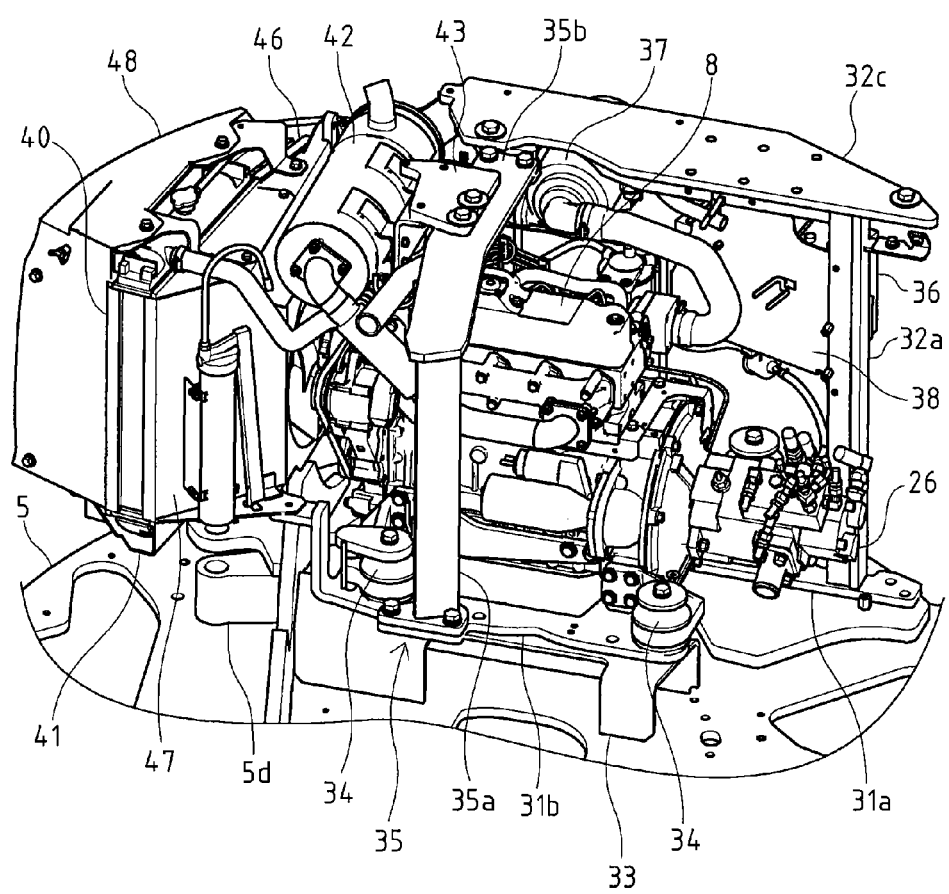
FIG. 6 is a front perspective view of an engine supporting part.

As shown in FIG. 1, FIG. 2, and FIG. 3, in a rear ultraminiature rotary type power shovel in which a rotary working machine such as working machine 1 is attached at the middle in the left and right direction of the front part of a main equipment 2, a rotation table frame 5 is supported by way of a rotary base bearing at the middle of the upper part of a crawler traveling device 3 in a manner that allows left and right rotation, and a rotary motor 6 is arranged on the rotation table frame 5. A blade 7 is arranged on either the front or the rear side of the crawler traveling device 3 in a manner that allows the blade to turn freely up and down. A bonnet 10 for covering an engine 8 etc. is arranged on the upper part of the rotary frame 5, and a driver's seat 11 is arranged on the bonnet 10 or on the front side of the bonnet 10. An operation lever, a lock lever, and the like are arranged near the driver's seat 11, and a travel lever and a pedal are arranged on a step 12 on the front side of the driver's seat 11 thereby configuring a drive operation unit 13. A canopy 14 or a cabin is arranged above the drive operation unit 13.

A boom bracket 15 is attached at the middle in the left and right direction of the front end of the rotation table frame 5 in a manner that allows left and right turning, and a lower end of a boom 16 is supported by the boom bracket 15 in a manner that allows up and down (front and back) turning. The boom 16 is bent towards the front at the middle to be formed to a substantially dogleg shape in a side view. A rear end of an arm 17 is supported at the upper end of the boom 16 in a manner that allows front and back turning, and a bucket 18, which is a work attachment, is supported at the front end of the arm 17 in a manner that allows it to turn freely front and back. A boom turning boom cylinder 20 is interposed between the front part of the boom bracket 15 and the front part of the middle part of the boom 16; an arm turning arm cylinder 21 is interposed between a rear surface of the middle part of the boom 16 and a stay arranged at the rear end of the arm 17; and a bucket turning bucket cylinder 22 is interposed between the stay at the rear part of the arm 17 and the bucket 18. The boom 16, the arm 17, the bucket 18, and each cylinder 21, 22, 23 configure the working machine 1.

In the working machine 1, the boom 16 can be turned by an extension drive of the boom cylinder 20, the arm 17 can be turned by an extension drive of the arm cylinder 21, and the bucket 18 can be turned by an extension drive of the bucket cylinder 22. In the main equipment 2, the rotation table frame 5 on the crawler traveling device 3 is rotatable by the rotation drive of the rotary motor 6. The cylinders 21, 22, 23, which are hydraulic actuators, and the rotary motor 6 are configured so as to be driven by a supply of pressure on oil through a hydraulic hose from a hydraulic pump 26 arranged on the rotation table frame 5 when a control valve 25 is switched through a turning operation of the operation lever, pedal, or the like arranged on the drive operation unit 13.

As shown in FIG. 2 through FIG. 5, an opening 5a for arranging a rotary base bearing is formed at the middle in the front and back and in the left and right directions of the rotation table frame 5, where the center serves as the center of rotation of the main equipment 2. The rear part of the rotation table frame 5 is formed so that an outer peripheral shape has a semicircular (substantially ⅗ circle) shape with the center of rotation as the center in plan view, where the radius of the semicircular portion is substantially the same as the radius of the rotation trajectory of the rear end of the rotation table frame 5. In other words, the distance from the center of rotation to the circular arc portion is assumed to be the radius of the rotation trajectory of the substantially circular shape drawn by the rear part of the rotation table frame 5. The rotation table frame 5 has the left and right width substantially matching the left and right width of the crawler traveling device 3 and is configured to be rotatable by the drive of the rotary motor 6 arranged in the vicinity of the opening 5a on the crawler traveling device 3.

The front part of the rotation table frame 5 is cut to be a straight line in the left and the right direction so that the outer peripheral shape has a linear shape. A boom bracket attachment part 5b for attaching the boom bracket 15 is configured to a substantially triangular shape in plan view and is arranged so as to project towards the front side at the middle in the left and the right direction of the linear part; and it is arranged so that the boom bracket 15 for attaching the working machine 1 is positioned within the rotation radius at the front part of the boom bracket attachment part 5b. The drive operation unit 13 is arranged on the left side of the rotation table frame 5, the bonnet 10 is arranged on the right side and the rear part so as to lie along the outer peripheral shape of the rotation table frame 5, and the engine 8, the hydraulic pump 26, the fuel tank, the hydraulic fluid tank, the radiator and the like are accommodated in the bonnet.

Furthermore, a step difference part 5c depressed towards the rear side is arranged on either the left or the right side at the front part of the rotation table frame 5 or, in the present example, on the right side which is on the symmetrically opposite side with respect to the drive operation unit 13. The front surface of the step difference part 5c extends in the left and right direction. An opening 10a is formed on the upper side of the front surface of the step difference part 5c, and a swing cylinder 28 is arranged so as to project towards the boom bracket 15 from the opening 10a. The swing cylinder 28 has the rear end pivotally supported in a freely turning manner by a pivot supporting part 5d arranged on the rotation table frame 5 and the front end connected to the boom bracket 15, so that the boom bracket 15 can be turned to the left and the right with respect to the rotation table frame 5 by the extension drive.

Furthermore, a second step 29 is arranged on the upper side of the step difference part 5c of the rotation table frame 5 so as to hide the step difference part 5c and the opening 10a, to cover the upper front part of a cylinder tube of the swing cylinder 28, and to be within the rotation radius. The second step 29 having a substantially triangular shape in plan view is detachably fixed to the front part of the bonnet 10 and is arranged so that the height of the upper surface coincides continuously in the left and right direction with the step 12 arranged at the front part of the drive operation unit 13. A walk through space opening in the left and right direction is thereby formed on the upper side of the step 12 and the second step 29, whereby the workable range in the main equipment 2 is enlarged by the walk through space and workability is improved. The hydraulic hose is collectively extended towards each cylinder 20, 21, 22 arranged in the working machine 1 from the opening 10a on the lower side of the second step 29, whereby maintenance is easily carried out by removing the second step 29.

On the rotation table frame 5 covered with the bonnet 10, a supporting body integrally configured with an engine support member 31 for supporting the engine 8 is arranged in the left and right direction on the rotation table frame 5 and a canopy installation member 32 for installing the canopy 14 is fixed and arranged on the rotation table frame 5, as shown in FIG. 6 to FIG. 9. The supporting body is configured to a substantially L-shape in plan view.

Figure 9:
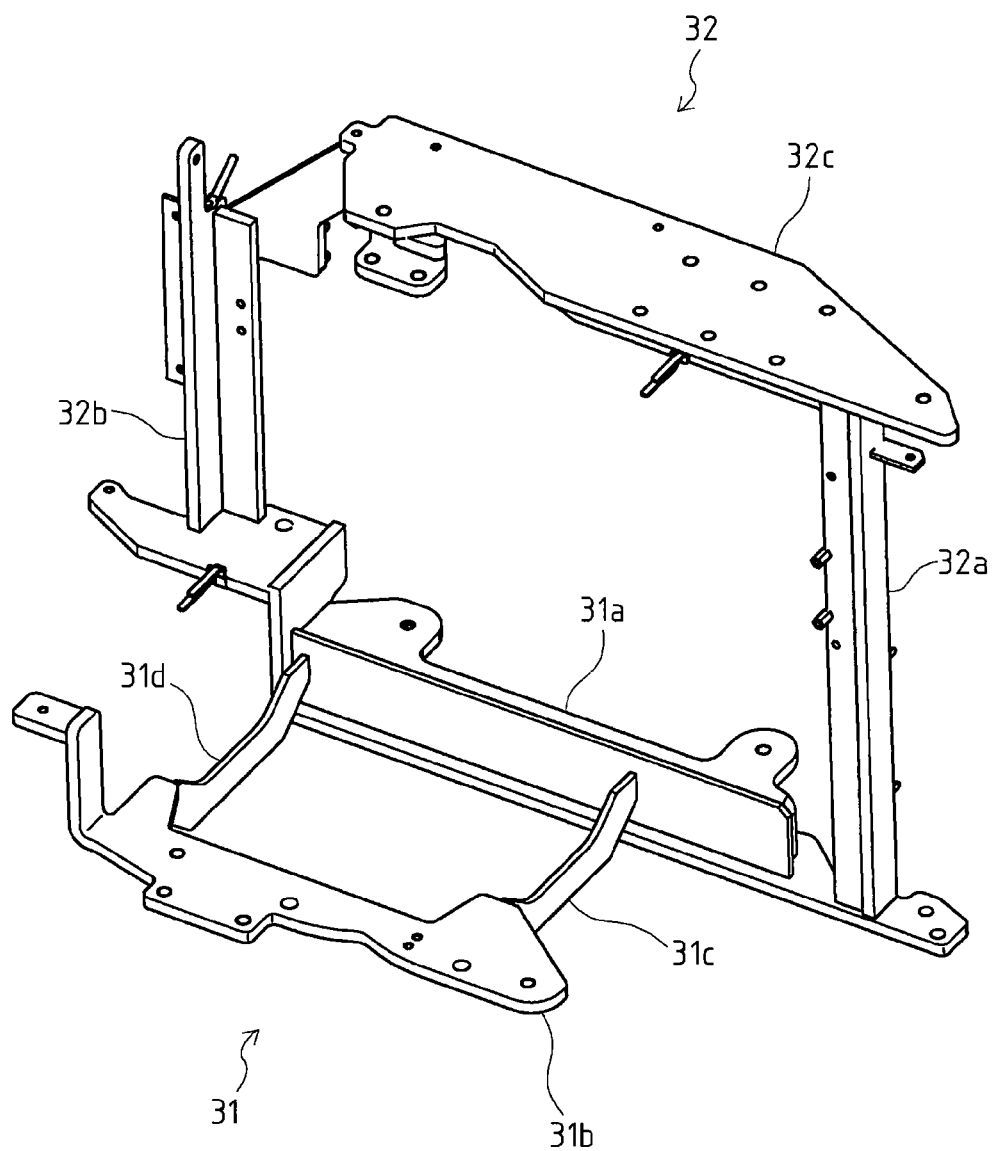
FIG. 9 is a perspective view of an engine supporting part.

As shown in FIG. 9, the engine support member 31 includes a back frame 31a and a front frame 31b arranged in parallel on the front and the back in the left and right direction and frames 31c, 31d arranged in parallel on the left and the right in the front and back direction, where the frames 31a, 31b, 31c, 31d are arranged in a horizontal direction and configure a frame shape. The back frame 31a is directly fixed and arranged on the rotation table frame 5, and the front frame 31b is fixed and arranged on the rotation table frame 5 by way of a bracket 33 folded to a reverse U-shape in a side view. The left and right frames 31c and 31d configured to a ship bottom shape in side view are transversely arranged at an appropriate spacing between the back frame 31a and the front frame 31b. The engine 8 is supported on the back frame 31a and the front frame 31b of the engine support member 31 by way of a vibration absorption member 34, and the canopy installation member 32 is raised at the back frame 31a.

The canopy installation member 32 includes column shaped left and right frames 32a, 32b and a plate shaped canopy installation plate 32c, where the left and right frames 32a, 32b are fixed and arranged so as to project to the upper side from both the left and right sides of the back frame 31a of the engine support member 31, and the canopy installation plate 32c is transversely arranged between the upper ends of the left and right frames 32a, 32b. The canopy installation member 32 is thereby integrally formed with the engine support member 31 and fixed on the rotation table frame 5 with a bolt etc., and thus tilt or vibration in the front and back direction can be reduced compared to when it is fixed and arranged on the rotation table frame 5 alone. That is, since a heavy engine is mounted on the engine support member 31, the canopy installation member 32 is less likely to tilt towards the rear side, and the tilt towards the front side is inhibited by the engine support member 31; and thus it is stably supported on the rotation table frame 5. The canopy installation plate 32c is arranged on the rear side of the driver's seat 11 of the drive operation unit 13, and the canopy 14 is attached and fixed on the canopy installation plate 32c.

Furthermore a reinforcement member 35 is connected between the upper part of the canopy installation member 32 and the front part of the engine support member 31 to reinforce the supporting body. That is, the reinforcement member 35 is configured by forming the plate to a substantially reverse L-shape in a side view; it is arranged so as to surround the upper front side of the engine 8, connected to the front frame 31b of the engine support member 31 at the lower part of a vertical part 35a, and connected to the canopy installation plate 32c of the canopy installation member 32 at the rear part of a horizontal part 35b. The canopy installation member 32 and the engine support member 31 are formed to a frame shape in side view and firmly fixed by the reinforcement member 35.

Thus, the canopy installation member 32 and the engine support member 31 are integrally fixed on the rotation table frame 5, and the canopy installation member 32 can be firmly fixed and stabilized compared to when the canopy installation member 32 is fixed alone on the rotation table frame 5. The canopy installation member 32 and the engine support member 31 can be assembled to the rotation table frame 5 with various equipment attached to the canopy installation member 32 and the engine support member 31, whereby the assembling performance as a module can be improved.

The equipment to be attached to a supporting body integrally configured by the canopy installation member 32 and the engine support member 31 includes a battery 36, an air cleaner 37, a radiator 40, and the like. The battery 36 is supported and fixed on a battery mounting base 38 attached to the left frame 32a of the canopy installation member 32 and is arranged on the rear side of the upper left part of the engine 8. The air cleaner 37 is attached to the bottom surface of the canopy installation plate 32c by way of a stay 39 and the like and is arranged on the upper rear side of the middle part in the left and right direction of the engine 8. The radiator 40 is supported on a radiator supporting base 41 attached to the right end of the back frame 31a and the front frame 31b of the engine support member 31 and is arranged on the right side of the engine 8. The hydraulic hose and harness are additionally attached to the canopy installation member 32 so that vibration and entanglement are prevented.

A muffler 42 is attached to the reinforcement member 35. The muffler 42 is attached by way of a stay 43 attached to the horizontal part 35b of the reinforcement member 35 and is arranged in the front and back direction at the upper side of the engine 8. As various equipment can be attached to the supporting body, the engine 8 is attached to the supporting body; and then various equipment such as the battery 36 or the air cleaner 37, the radiator 40, and the muffler 42 are attached to the canopy installation member 32 and the reinforcement member 35 from the front and back and left and right periphery of the engine before attaching it to the rotation table frame 5, whereby the assembly task can be performed with tools and hands brought closer to each part, and the assembly task can be reliably and easily performed.

Figure 7:
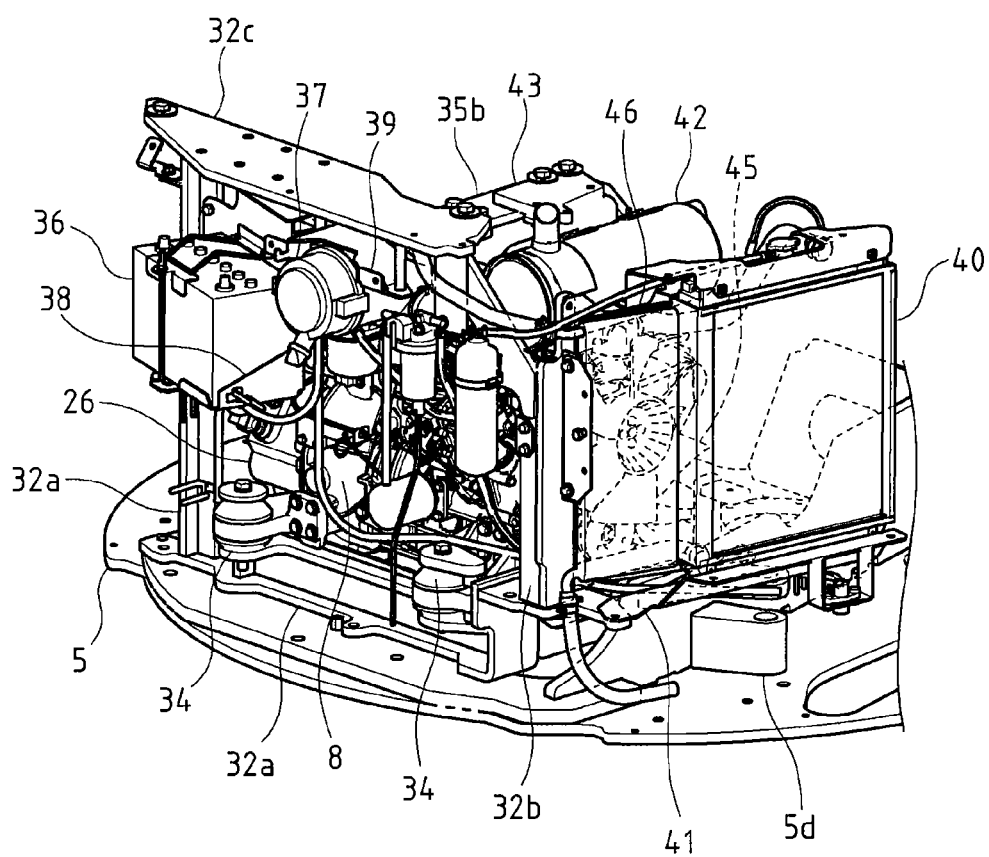
FIG. 7 is a rear perspective view of an engine supporting part.
Figure 8:
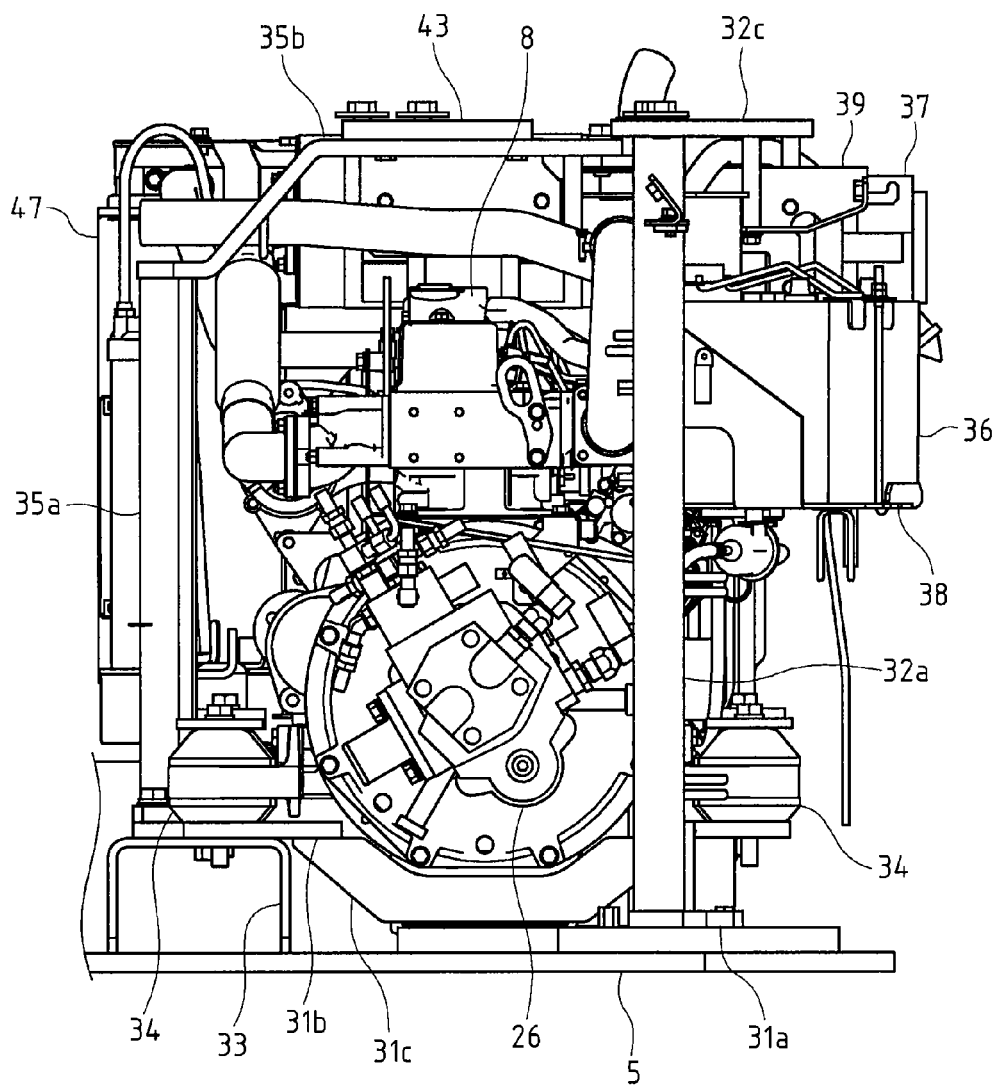
FIG. 8 is a left side view of an engine supporting part.

As shown in FIG. 3, the engine 8 supported on the engine support member 31 is arranged so that a crank shaft lies in the left and right direction of the equipment body. A cooling fan 45 is arranged on the right side of the engine 8and is drivable through a belt and a pulley by the engine 8. As shown in FIG. 7, the radiator 40 and the oil cooler 46 are continuously arranged in the front and the back direction on the right side of the cooling fan 45 and are arranged so as to be lined without overlapping in a side view and so that the front end faces the outer direction. A shroud 47 is arranged between the radiator 40 and the oil cooler 46 and the cooling fan 45, and a substantially triangular space is formed in plan view in the shroud 47. The cooling airflow produced by the rotation of the cooling fan 45 thereby passes through a space in the shroud 47 and simultaneously hits the radiator 40 and the oil cooler 46 to cool the same.

Figure 10:
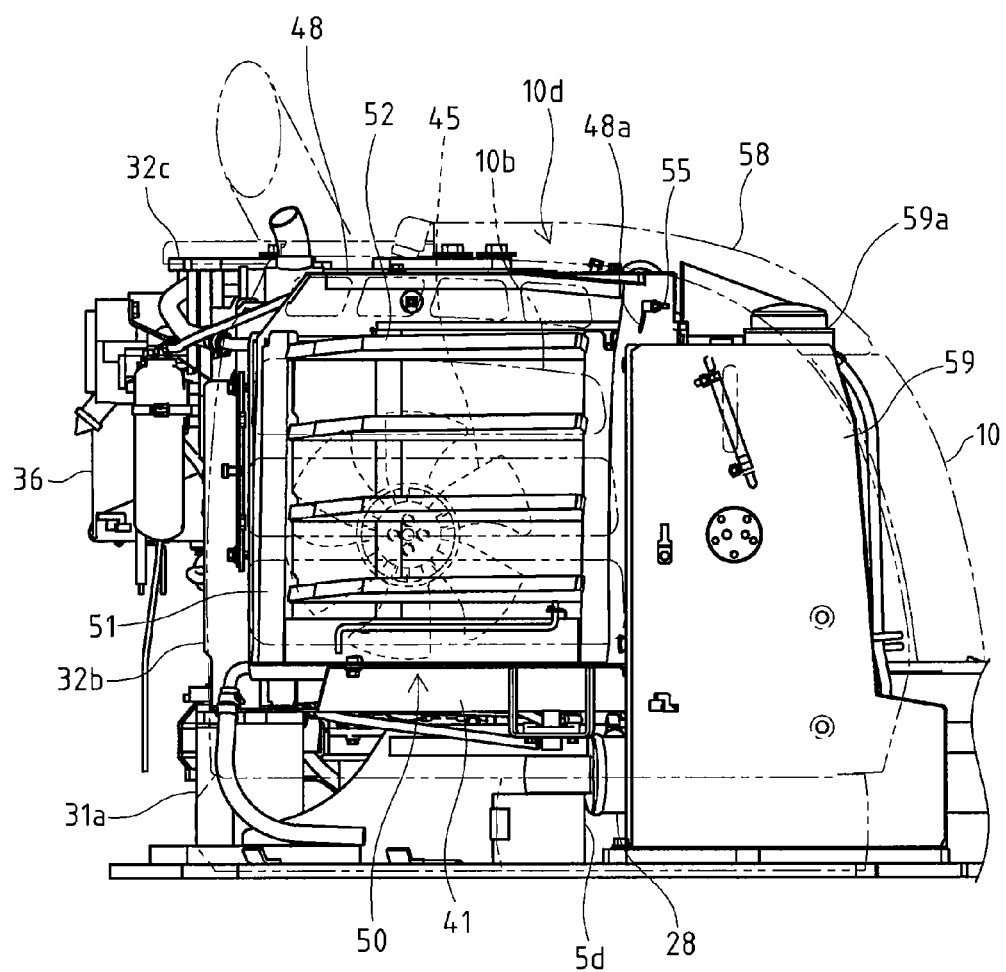
FIG. 10 is a right side view showing an arrangement structure of the rotation table frame.

As shown in FIG. 2 and FIG. 10, the radiator 40 and the oil cooler 46 are arranged with a predetermined spacing from the side wall of the bonnet 10 formed to a circular arc shape, and a duct 48 is arranged between the radiator 40 and oil cooler 46 and the side wall of the bonnet 10. An opening 10b is formed at a portion facing the radiator 40 and the oil cooler 46 at the side surface of the bonnet 10 so that the duct 48 communicates with the outside through the opening 10b, and the cooling airflow from the cooling fan 45 can be discharged to the outside from the duct 48 and the opening 10b. A cross rail 10c is bridged parallel in the up and down direction at the opening 10b, and a mesh form member is arranged, whereby protection of the radiator 40 and the oil cooler 46 is achieved by the cross rail 10c and the mesh form member.

A movable louver 50 is arranged in the duct 48 between the radiator 40 and oil cooler 46 and the opening 10b formed at the side surface of the bonnet 10 so that the airflow direction of the cooling airflow can be changed when the cooling airflow from the cooling fan 45 is discharged to the outside from the opening 10b by the louver 50.

Figure 11:
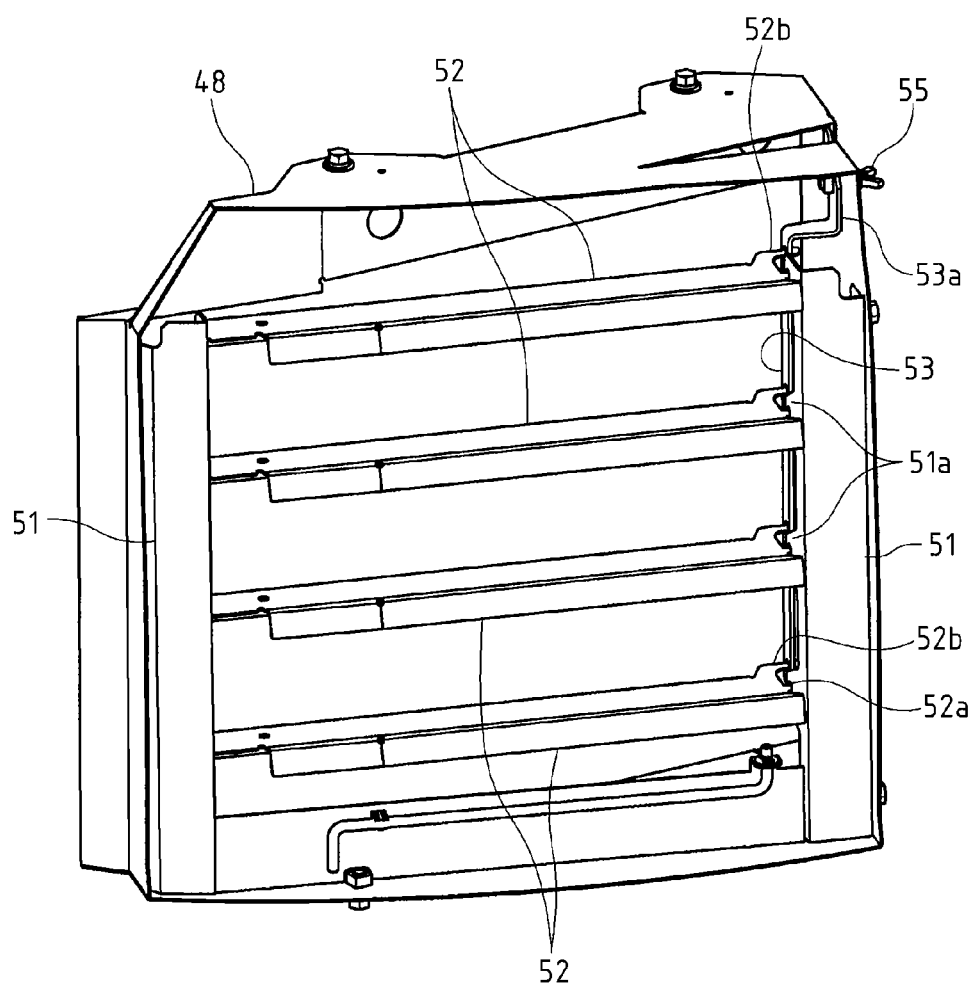
FIG. 11 is a side view of a louver.
Figure 12:
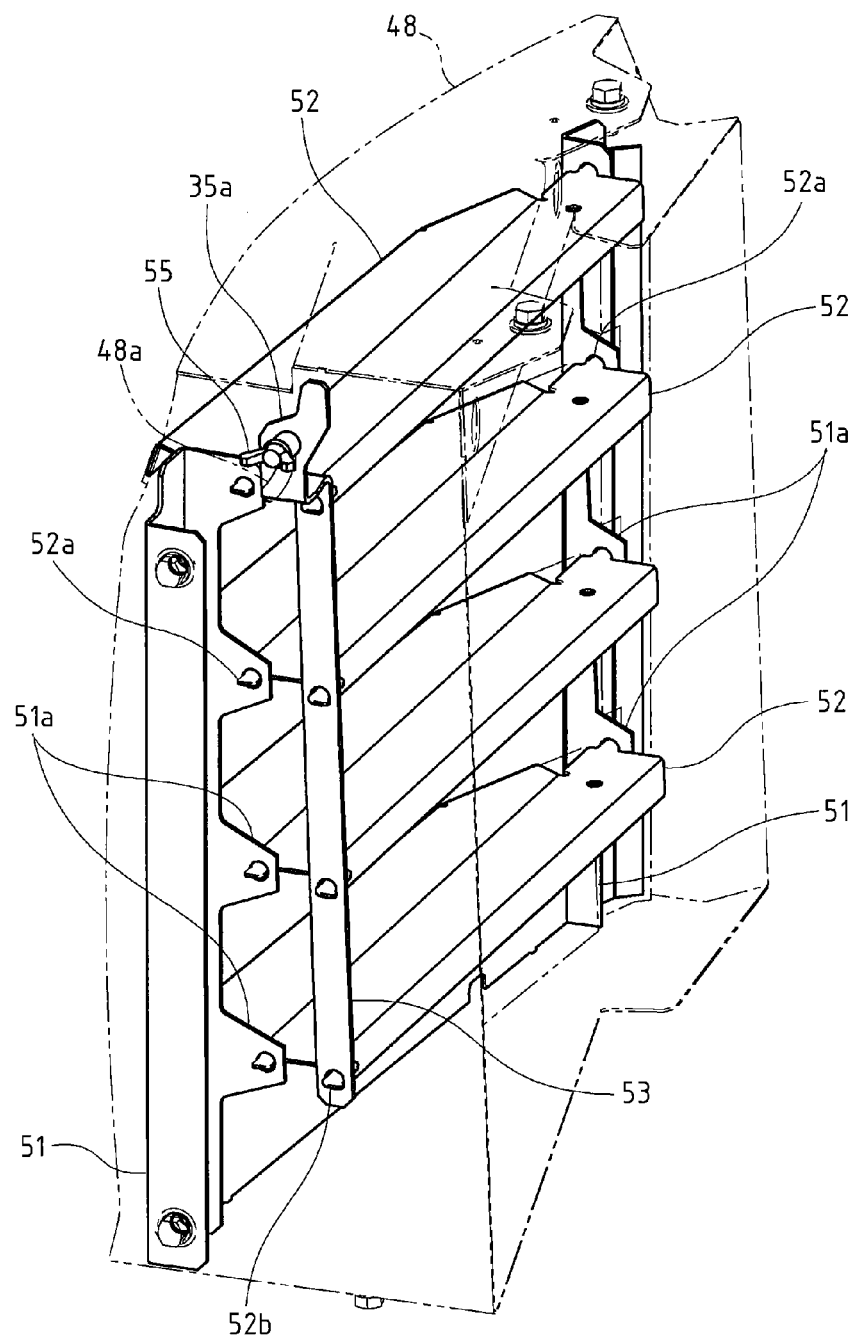
FIG. 12 is a perspective view of the louver.

As shown in FIG. 11 and FIG. 12, the louver 50 is configured from a pair of front and back side frames 51, 51 fixed and arranged on the side wall of the duct 48; blades 52, 52 . . . arranged in plurals in the up and down direction between the side frames 51, 51; a means for changing the angle of the blades 52, 52 . . . ; and a position fixing member of the angle. The blades 52, 52 are bridged in parallel in the up and down direction and are formed with shaft parts 52a, 52a projecting towards the side frames 51, 51 from one end in the short side direction at both ends in the longitudinal direction of each blade 52. The shaft parts 52a, 52a are pivotally supported by bearing parts 51a, 51a arranged at a predetermined spacing in the up and down direction of each left and right side frames 51, 51. The louver 50 is movably configured by supporting both sides of each blade 52 with the left and right side frames 51, 51 in a manner that allows turning. The blade 52 has the outer side bent slightly towards the diagonally upward side, where the portion facing the oil cooler 46 has a narrow width and has a shape that lies along the side wall of the bonnet 10.

A pivotally supporting part 52b is arranged in a projecting manner parallel to the shaft part 52a from the other end in the short side direction at one end in the longitudinal direction of each blade 52, and the pivotally supporting part 52b is pivotally supported by a lever 53 arranged in the up and down direction parallel to the side frame 51. The lever 53 is then connected to the blades 52, 52, . . . so that the blades 52, 52, . . . can be turned in the same direction by moving the lever 53 in the up and down direction. The upper part of the lever 53 is extended to the upper side of the duct 48, and the upper end part 53a thereof is bent so as to contact the side wall of the duct 48. The position fixing member is arranged between the upper part of the lever 53 and the duct 48. That is, a bolt is projected to the side from the upper end part 53a of the lever 53.

A circular arc shaped long hole 48a is formed in the side wall of the duct 48 on the side of the upper end part 53a of the lever 53, the bolt is projected to the outside through the long hole 48a, a butterfly nut 55 is attached, and the butterfly nut 55 is tightened so that the lever 53 can be fixed at an arbitrary position in which it can be operated. The louver 50 thus can change and hold the blades 52, 52, . . . at an arbitrary angle. The fixing means of the lever 53 is not limited to a bolt and a nut and may be a pin and the like; or the motor may be coupled to one of the shaft parts 52a to change the angle of the blades 52, 52, . . . with the motor, or the lever 53 may be coupled to a cylinder to change the angle of the blades 52, 52, . . . by extending the cylinder. Remote operation may be performed with an operation means in which an actuator such as a motor or a cylinder is arranged in the operation unit.

The louver 50 is thus configured to hold the blades 52, 52, . . . at an arbitrary angle by operating the lever 53 from above the duct 48. A state in which the outer side of the blade 52 is tilted and held towards the diagonally upper side is obtained when the nut 55 is positioned and tightened at the upper end of the long hole 48a formed in the side wall of the duct 48 to have the lever 53 in the upper most position, or the blade 52 may be held at a substantially horizontal state when the nut 55 is positioned and tightened at the lower end of the long hole 48a to fix the lever in the lower most position. The nut 55 can be positioned and fixed at an arbitrary position in the up and down direction of the long hole 48a.

Therefore, after the radiator 40 and the oil cooler 46 are cooled by the cooling airflow produced by the rotation of the cooling fan 45, the cooling airflow is discharged from the opening 10b formed in the bonnet 10, but the discharging direction of the cooling airflow can be angularly changed to the side or to the diagonally upper side of the main equipment depending on the situation. Thus, the warmed cooling airflow is prevented from blowing against trees and on walkers. For instance, if there are trees on the side of the main equipment, the cooling airflow can be discharged so as not to blow against the trees by changing the discharging direction of the cooling airflow to the diagonally upper side of the main equipment. The warmed cooling airflow sometimes blows against the operator on the drive operation unit 13 depending on the airflow direction when discharged to the upper side. In such a case, the cooling airflow can be discharged to the side by being changed to a substantially horizontal direction, thereby preventing the warmed cooling airflow from blowing on the operator.

The nut 55 for adjusting the louver 50 is arranged on the lower side of the cover 58 covering the maintenance space 10d arranged on the front right part of the bonnet 10, as shown in FIG. 10. The cover 58 has the rear end pivotally supported by the equipment body and is configured to turn in the up and down direction with the rear end as the center in order to be opened and closed. When the cover 58 is turned upward and opened, the nut 55 is exposed so that the nut 55 can be operated, whereby the angle adjustment of the blades 52, 52, . . . of the louver 50 can be easily and rapidly performed.

Figure 13:
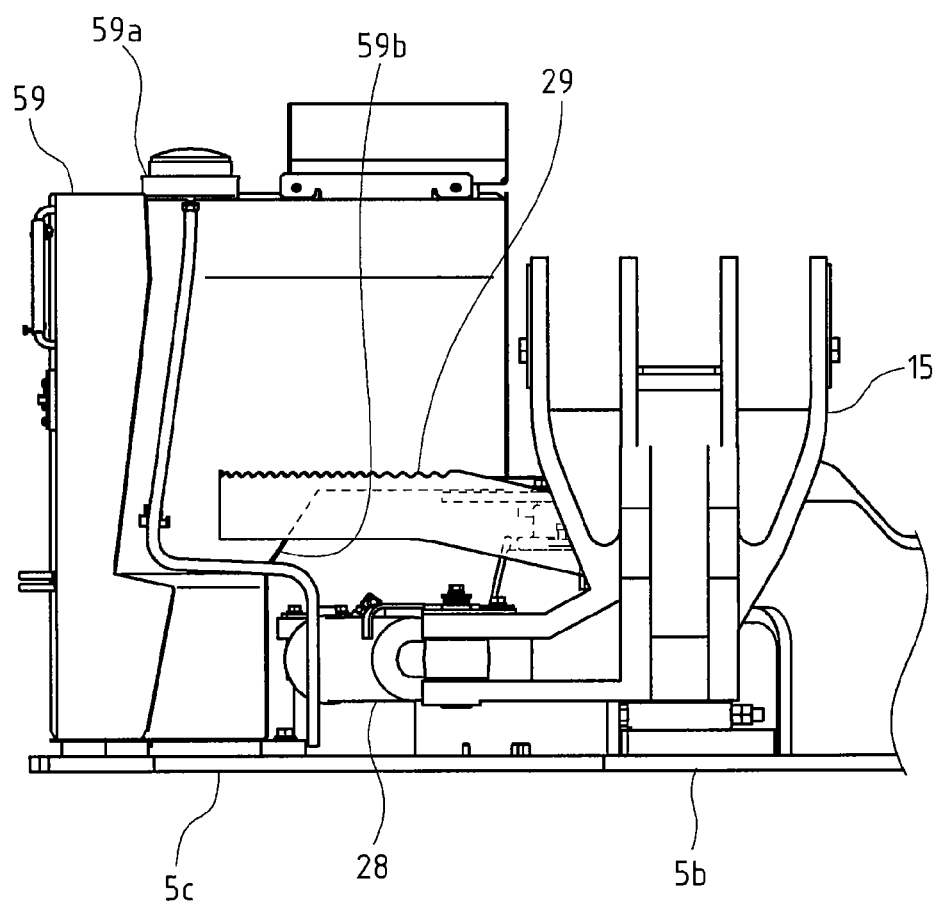
FIG. 13 is a front view showing an arrangement structure of the right side of a front part of the rotation table frame.

A fuel tank 59 is arranged on the front side of the radiator 40 and the louver 50. As shown in FIG. 10 and FIG. 13, the fuel tank 59 is mounted and fixed on the rotation table frame 5, and the upper part is covered with the cover 58. An oil supply port 59a is formed on the upper surface of the fuel tank 59 where the cover 58 is turned upward to be opened so that oil can be supplied to the fuel tank 59 from the oil supply port 59a. The inner side in the left and right direction of the equipment body at the lower part of the fuel tank 59 has a cutout shape, and the swing cylinder 28 is arranged in the cutout part 59b. The fuel tank 59 has the lower end bulging out towards the side of the swing cylinder 28 to enlarge the capacity, and it is arranged on the same left or right side of the swing cylinder 28 and the rotation table frame 5. A reservoir tank may be similarly configured and arranged in place of the fuel tank 59.

The second step 29 is arranged on the front side of the fuel tank 59, so that the worker can turn and open the cover 58 on the second step 29 to perform an angle adjustment of the blade 52 of the louver 50 and to supply oil from the oil supply port 59a to the fuel tank 59.

The hydraulic pump 26 is arranged on the symmetrically opposite side with respect to the radiator 40 of the engine Band is drivable by the engine 8. As shown in FIG. 3, a reservoir tank 61 is arranged on the left side of the hydraulic pump 26, and the control valve 25 is arranged on the front side of the reservoir tank 61. The control valve 25 and the hydraulic pump 26, the reservoir tank 61 and control valve 25 and the rotary motor 6, the swing cylinder 28, and each cylinder 20, 21, 22 of the working machine 1 are connected with the hydraulic hose, and the hydraulic oil is supplied from the reservoir tank 61.

Figure 14:
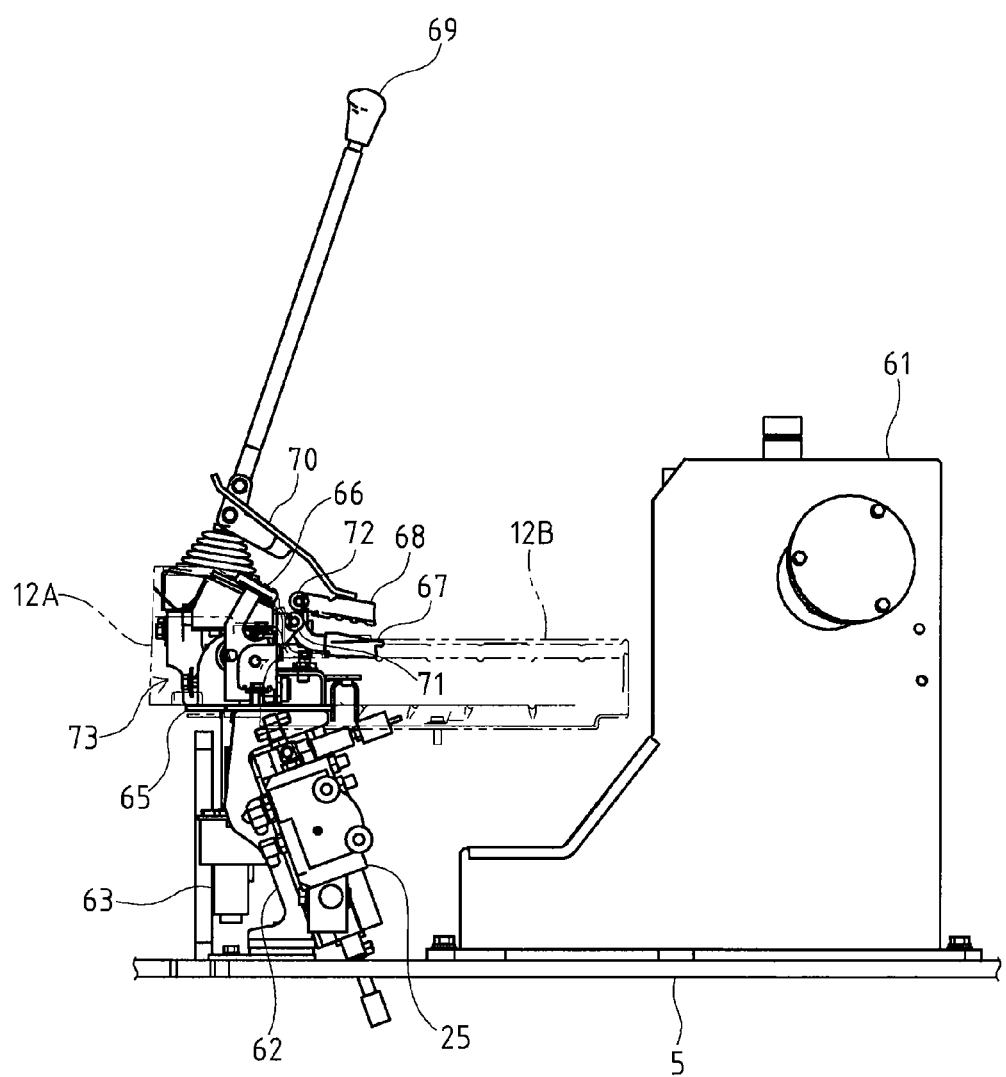
FIG. 14 is a left side view showing the arrangement structure of the rotation table frame.
Figure 15:
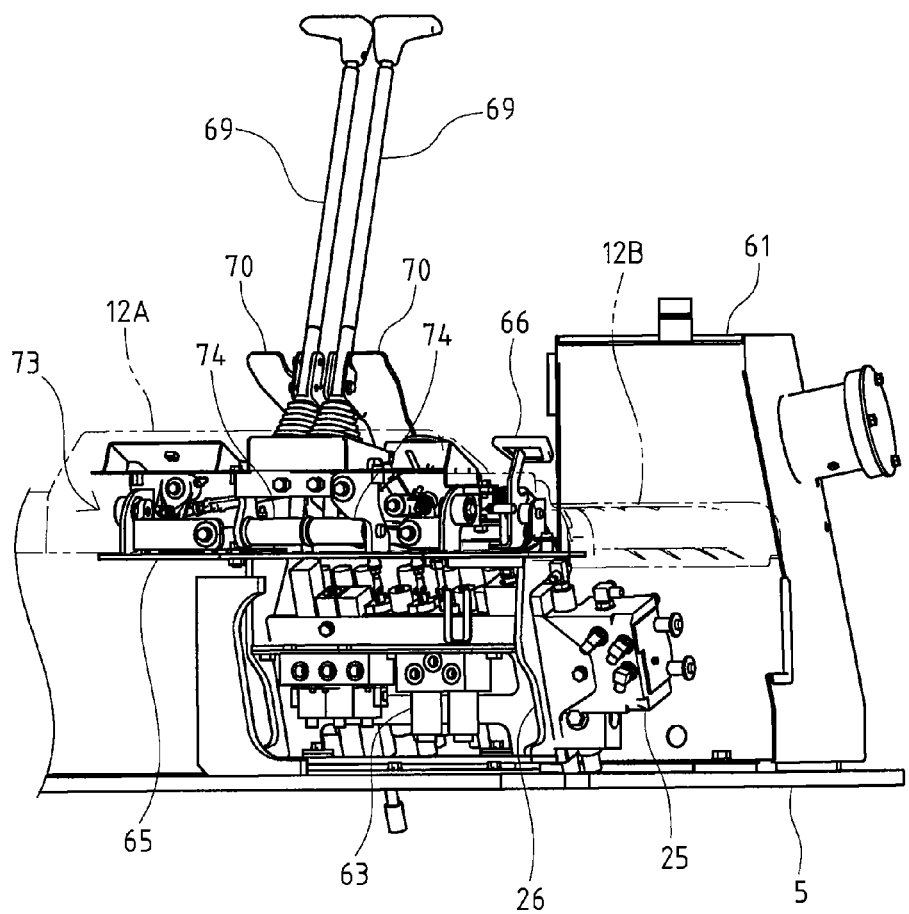
FIG. 15 is a perspective view showing the arrangement structure of the left side of the front part of the rotation table frame.

As shown in FIGS. 14 and 15, the control valve 25 is arranged on the front left part of the rotation table frame 5 at the front side of the reservoir tank 61, and the bracket 62 is held and fixed in a state raised in a tilted manner so as to be high on the front side and low on the rear side. Since the control valve 25 is arranged in a tilted manner, it can be arranged on the front side of the rotation table frame 5 as much as possible, and the rear end position of the control valve 25 can be positioned on the front side. The space on the rear side can be formed to be large, the front part of the reservoir tank 61 can be arranged in a bulging out manner in the relevant space, and the capacity of the reservoir tank 61 can be enlarged. An external take-out component 63 for breaker and the like which serves as a post-attachment working machine can be arranged in the space formed on the lower front side of the control valve 25.

A pedal base 65 is arranged on the upper end of the bracket 62 attached to the control valve 25, and the step 12 is arranged on the upper side of the pedal base 65. The step 12 includes a front step 12A covering the pedal base 65 and a back step 12B connected to the rear part of the step 12A, where a plurality of pedals and levers is arranged on the front step 12A or the back step 12B. In this case, a travel speed increasing pedal 66, a PTO operation pedal 67, and a swing pedal 68 are arranged lined in order from the left near the middle of the front part of the step 12, and a pair of left and right travel operation levers 69, 69 are arranged between the PTO operation pedal 67 and the swing pedal 68 so as to project to the upper side. Operation pedals 70, 70 are integrally arranged at the lower part of each left and right operation lever 69, 69 so that the operation levers 69, 69 can be operated with the operation pedals 70, 70.

Figure 16:
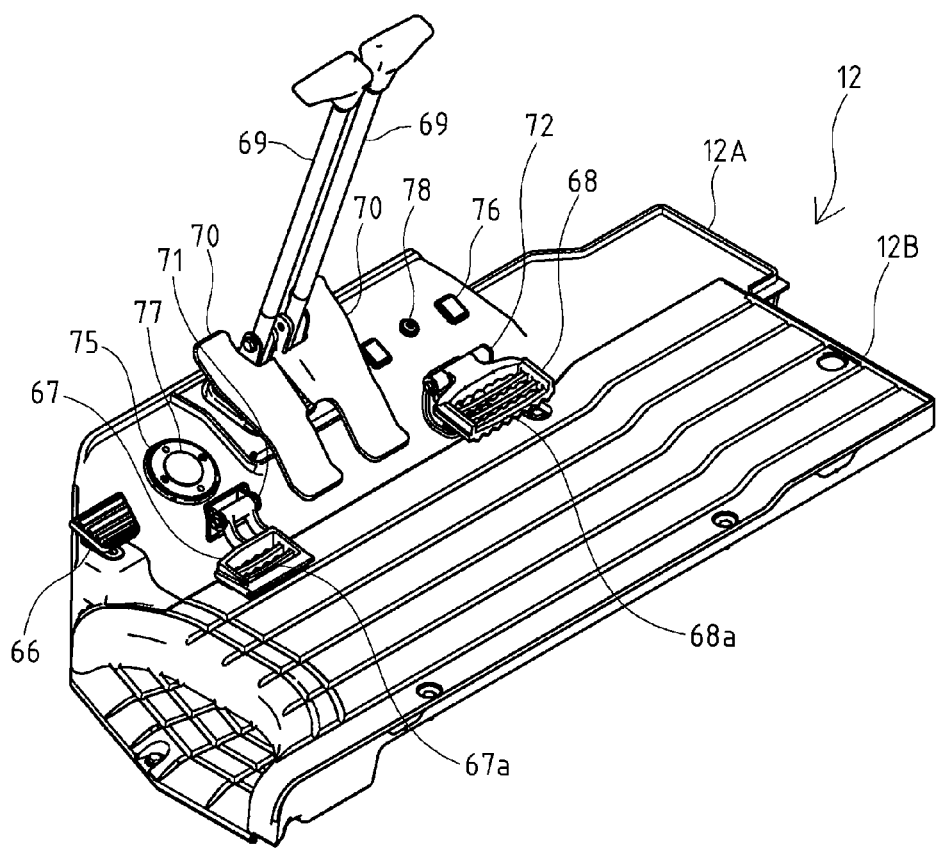
FIG. 16 is a perspective view showing a step part in a pedal operation state.
Figure 17:
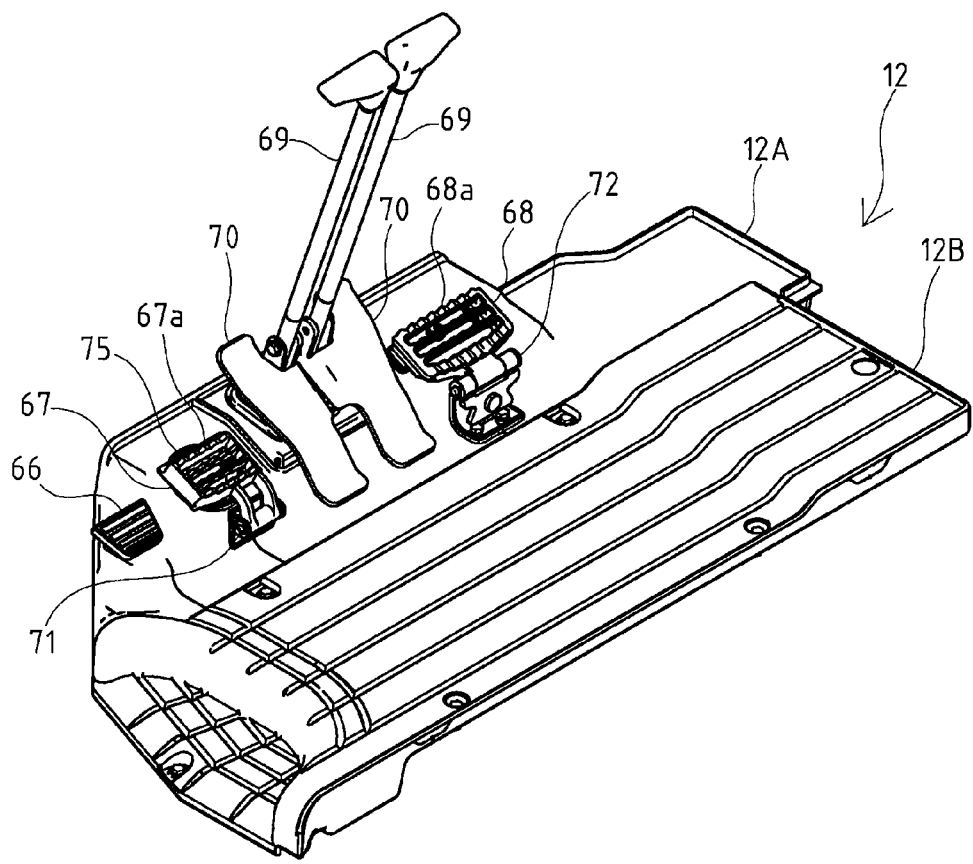
FIG. 17 is a perspective view of the step part in a pedal accommodating state.
Figure 18:
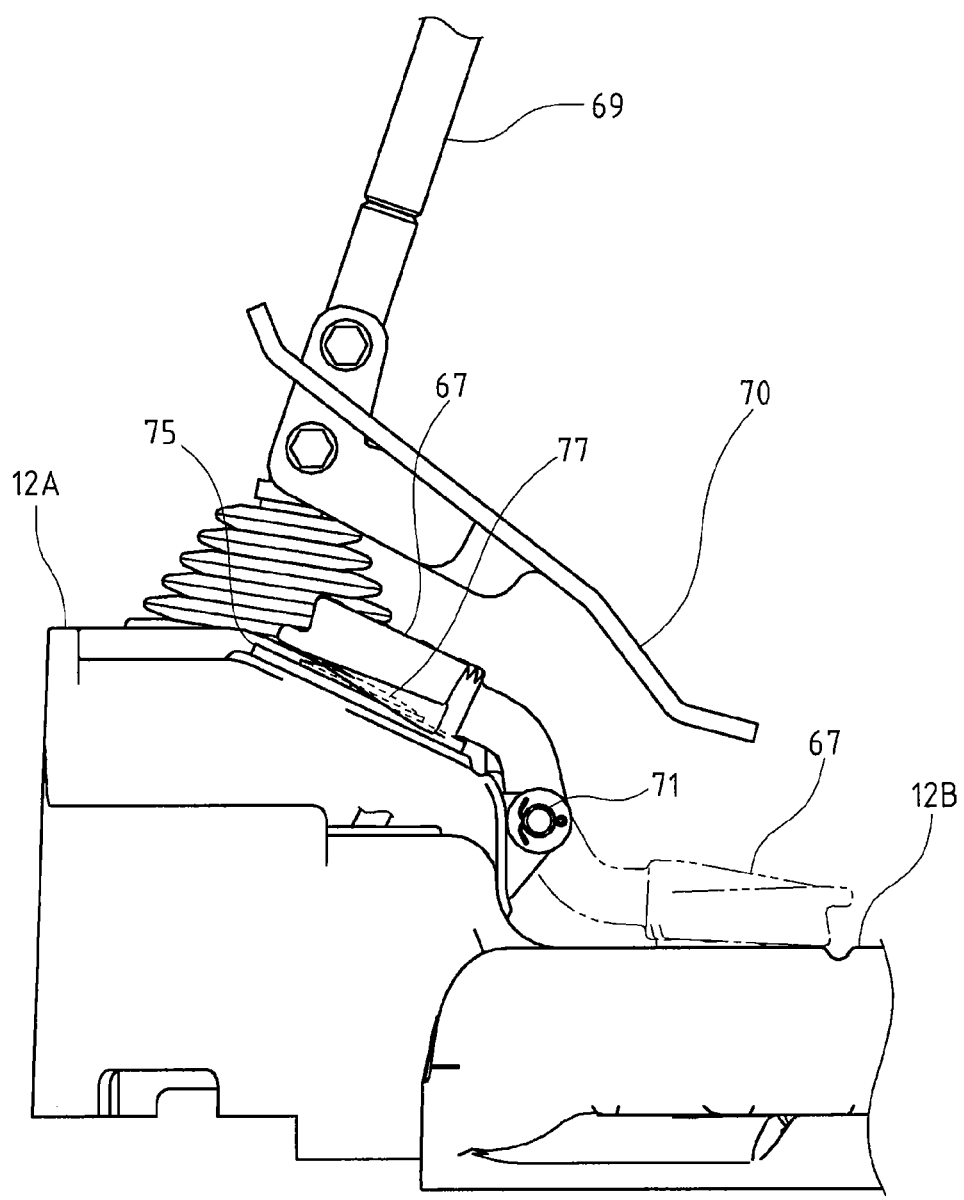
FIG. 18 is a side view of a pedal supporting part.

As shown in FIGS. 16 to 18, the PTO operation pedal 67 and the swing pedal 68 are supported with the supporting point axes 71, 72 at the center of the pedal base 65 on one side (front side) in a manner that allows front and back turning and are connected to the control valve 25 by way of a link mechanism 73 arranged on the pedal base 65. Similarly, the operation levers 69, 69 are supported with the supporting point axes 74, 74 at the center in a manner that allows front and back turning and are connected to the control valve 25 by way of the link mechanism 73 arranged on the pedal base 65. Since the control valve 25 is arranged in a diagonally tilted manner with the front side high and the rear side low as described above, the distance between the upper end of the control valve 25 and the operation lever 69 or the operation pedal 70 is shorter than when it is arranged horizontally as in the prior art, whereby the link mechanism 73 for connecting the components has a simple structure, and the cost can be reduced. The operation pedals 70, 70 can be stably pushed down and operated.

The PTO operation pedal 67 and the swing pedal 68 are formed into a substantially L-shape in a side view; one side is arranged with the foot placing parts 67a, 68a at both the upper and lower surfaces and the other end is pivotally supported at the supporting point axes 71, 72; the PTO operation pedal 67 and the swing pedal 68 are configured to be switchable between an operable state of being push-down operable and a non-operable accommodating state (foot rest state) by turning in the front and back direction. As shown in FIG. 16, each pedal 67, 68 is turned towards the rear side until positioned on the back step 12B and enters an operable state when contacting the operation member of the hydraulic actuator in the link mechanism 73; and as shown in FIG. 17, each pedal 67, 68 is turned with the front side up towards the front step 12A and enters a non-operable accommodating state when contacting a receiving member 75, 76 exposed on the step 12A to be in the foot rest state.

Each pedal 67, 68 is formed such that the middle of the placing part 67a, 68a is depressed downward in the operation state so that when the foot is placed on the placing part 67a, 68a and pressed down, the pedal turns in the up and down direction with the supporting point axes 71, 72 as the center, whereby the control valve 25 is operated through the link mechanism 73. The swing pedal 68 is operated by being swung to the left and the right. When switched from the operable state to the accommodating state by hand and turned towards the front side, the receiving member 75, 76 is contacted at both the left and right sides and held on the front step 12A. Option switches 77, 78 are arranged at the middle of the receiving members 75, 76 so as to be covered by the upwardly convex placing parts 67a, 68a of the pedals 67, 68 when the pedals 67, 68 are accommodated.

When the operation of the PTO operation pedal 67 to the swing pedal 68 is not necessary in such structure, the pedal 67, 68 is turned toward the front side with the supporting point axis 71, 72 as the center to contact the receiving member 75 of the front step 12A, whereby the push-down operation of the pedal 67, 68 is disabled and false operation is prevented. At the same time, the option switches 77, 78 are covered by the placing parts 67a, 68a of the pedals 67, 68, and false operation thereof is also prevented. The lower surface of the placing parts 67a, 68a of the pedals 67, 68 can also be used as a foot rest, whereby the space for the foot portion of the operator at the step 12 can be efficiently used.

When operation of the PTO operation pedal 67 or the swing pedal 68 becomes necessary, the pedal 67, 68 is turned towards the rear side with the supporting point axis 71, 72 as the center and arranged on the back step 12B so that push-down operation becomes possible. Therefore, if the pedals 67, 68 are not necessary, the pedals 67, 68 themselves are turned towards the front side from the back step 12B and are easily accommodated in the front step 12A, and the space for the foot portion of the operator at the step 12 can be enlarged. Since the non-operable state can be maintained by simply turning the pedals 67, 68 towards the front side, a pedal cover that disables the pedal as in the prior art is not necessary, and the number of components can be reduced.

Figure 19:
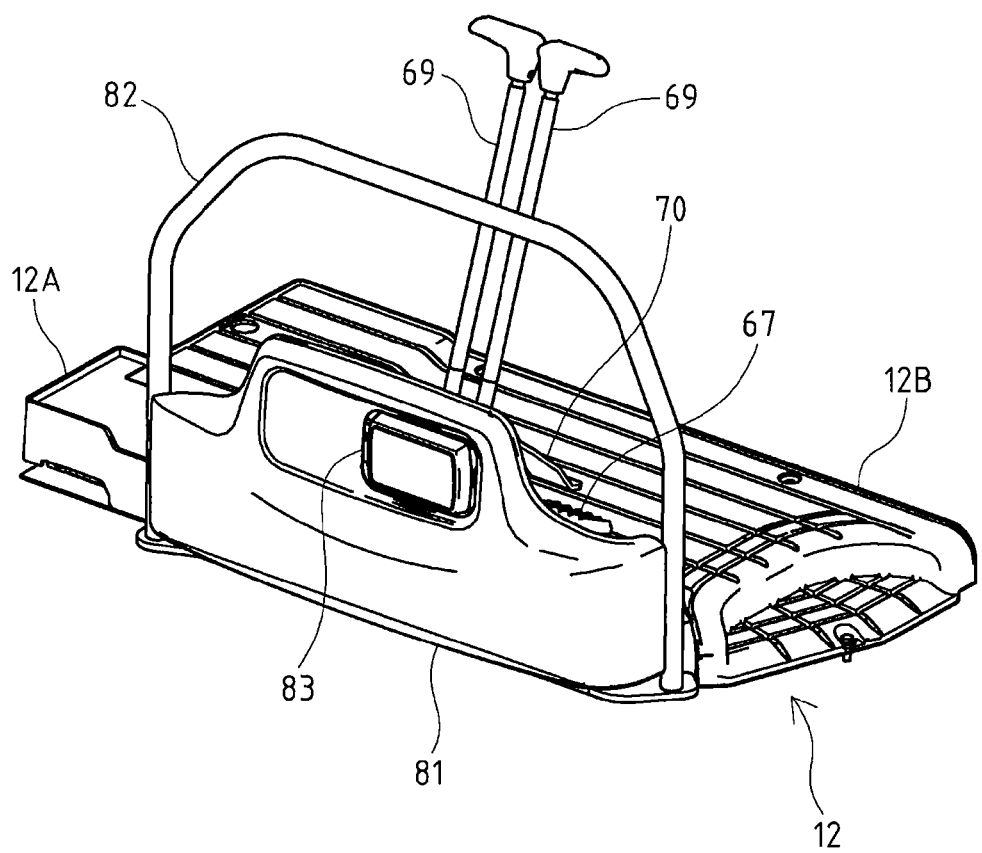
FIG. 19 is a perspective view of a front cover.
Figure 20:
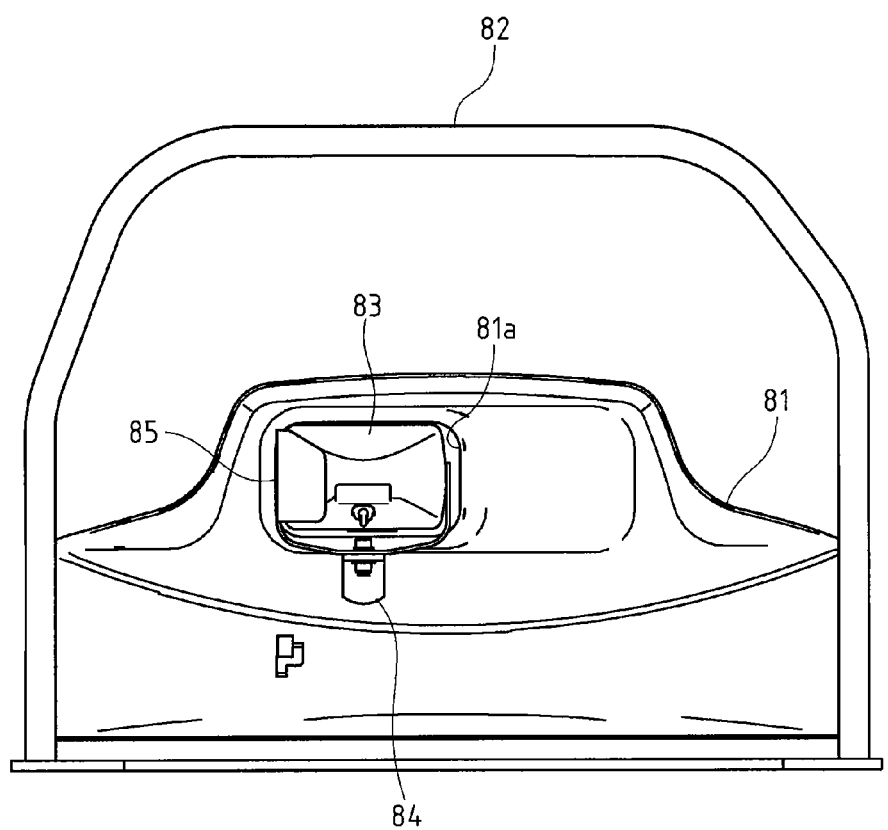
FIG. 20 is a rear view of the front cover.
Figure 21:
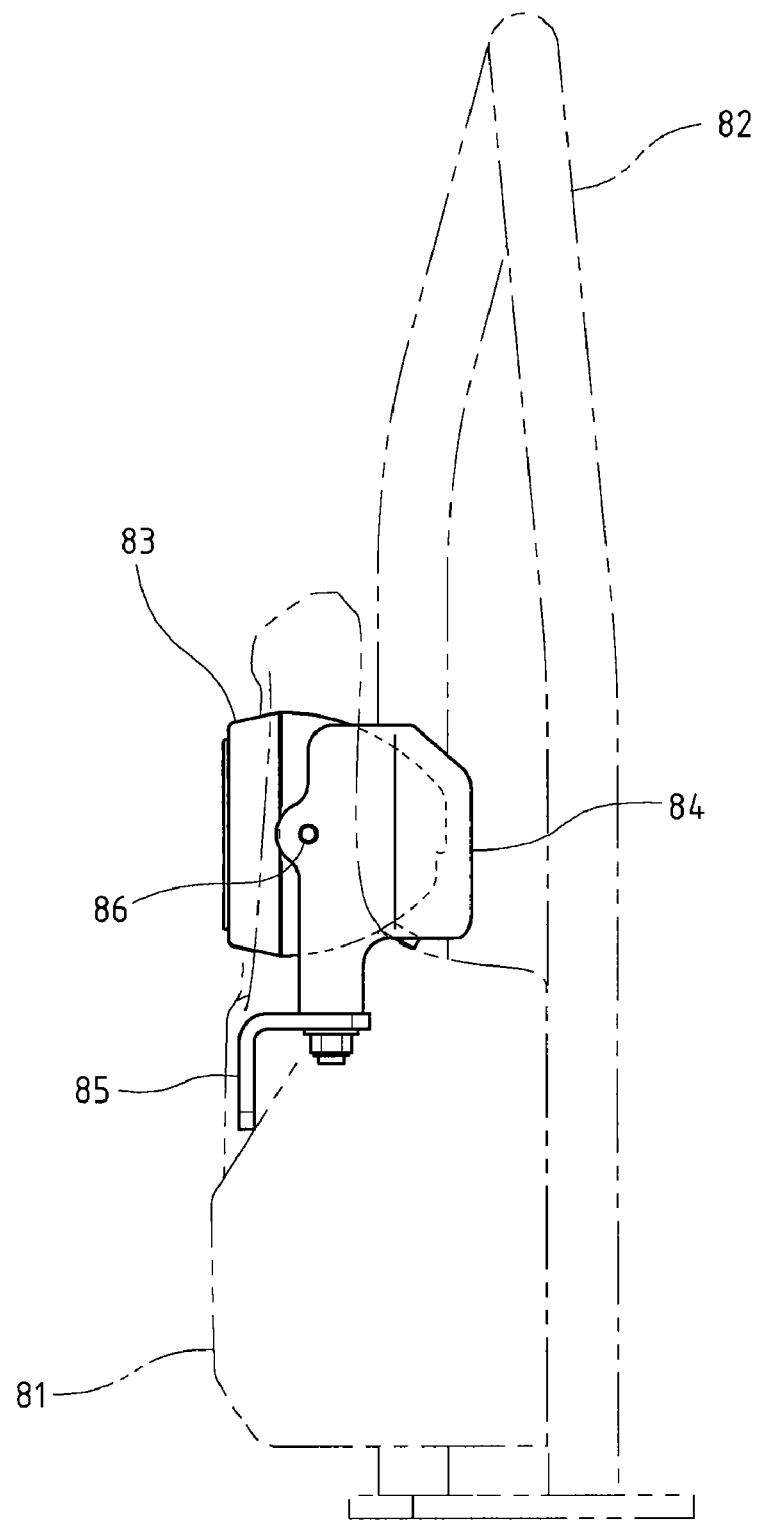
FIG. 21 is a side view showing a supporting structure of a front lamp.

As shown in FIG. 2, the front cover 81 is arranged at the front end of the step 12 so as to cover the front side of the PTO operation pedal 67, the swing pedal 68 and the like. As shown in FIG. 19 to FIG. 21, the front cover 81 is formed to be a convex form in a front view and is transversely arranged between a handrail 82 of a substantially gate shape in front view arranged in an upright manner at the front part of the step 12. An opening 81a is formed in the upper part of the middle of the front cover 81, and a front lamp 83 is arranged in the opening 81a so as to be in an as high as possible position at the front side of the drive operation unit 13. Thus, the front side of the operator can be lighted by the front lamp 83, which improves the surrounding visibility.

The front cover 81 is arranged such that the upper part of both the left and right sides are positioned on the front side of the pedals 67, 68 arranged on both the left and right sides of the step 12. Thus, when stretching the leg towards the front side of the pedal, the legs can be stretched towards the front side from both the left and the right sides of the front cover 81, thereby enlarging the space of the foot portion of the operator.

Figure 22:
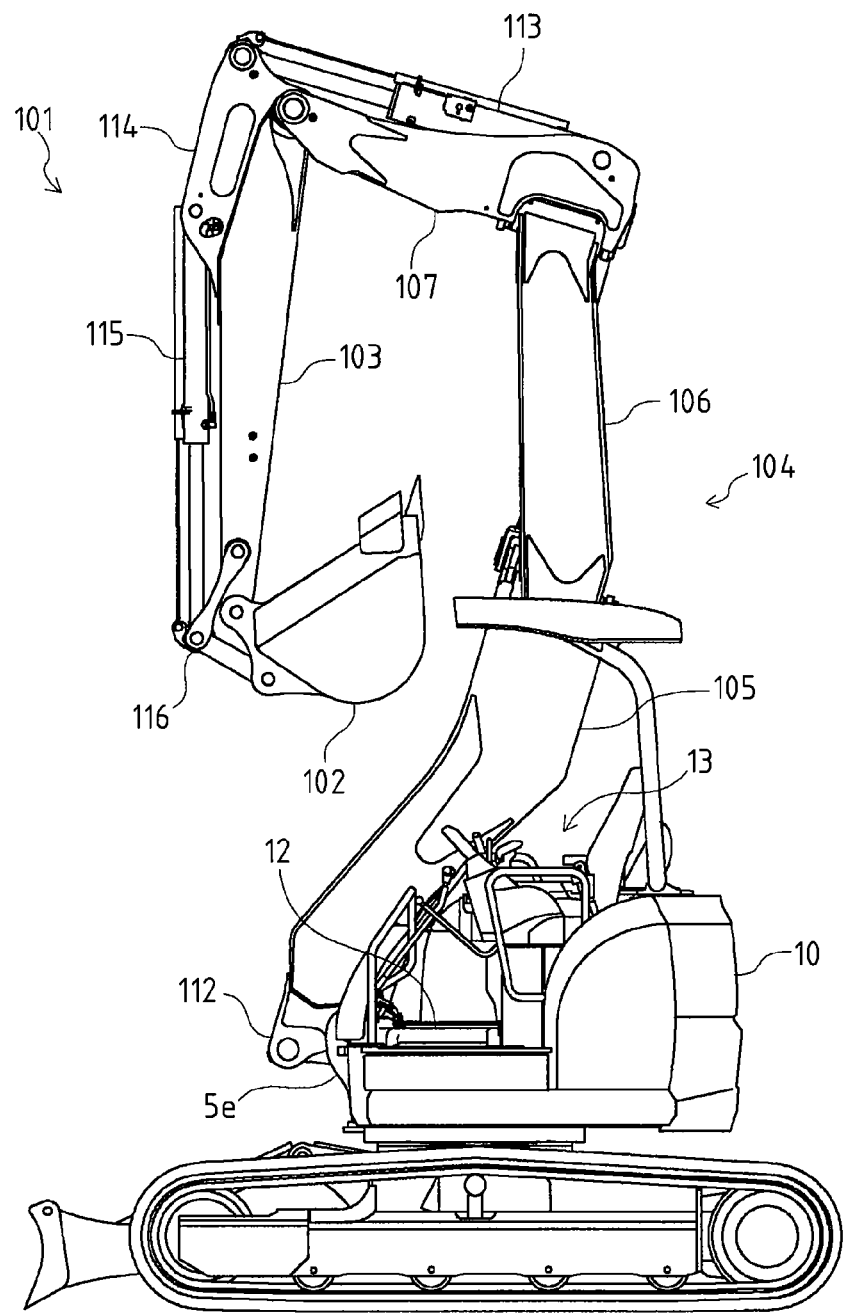
FIG. 22 is a left side view of an ultraminiature rotary type rotary working machine according to one example of the present invention.

The rotation table frame 5 including the engine 8, the hydraulic pump 26, the fuel tank, the hydraulic oil tank, the radiator, and the like is arranged with an attachment part at the middle in the left and right direction of a line extending in the left and right direction of the front part thereof to attach the working machine 1 so that the rotary working machine of a rear ultraminiature rotary type is obtained; but an attachment part may be arranged at the step difference part 5c formed on the right side of the front part to attach the working machine so that the rotary working machine of an ultraminiature rotary type is obtained, as shown in FIG. 22. That is, the rear ultraminiature rotary type and the ultraminiature rotary type rotary working machine have a common shape other than the front end of the rotation table frame 5, and thus they can be commonly used. Therefore, the molding die of the rotation table frame 5 in the rear ultraminiature rotary type and the ultraminiature rotary type rotary working machine can be shared, which enhances productivity and reduces cost.

Figure 23:
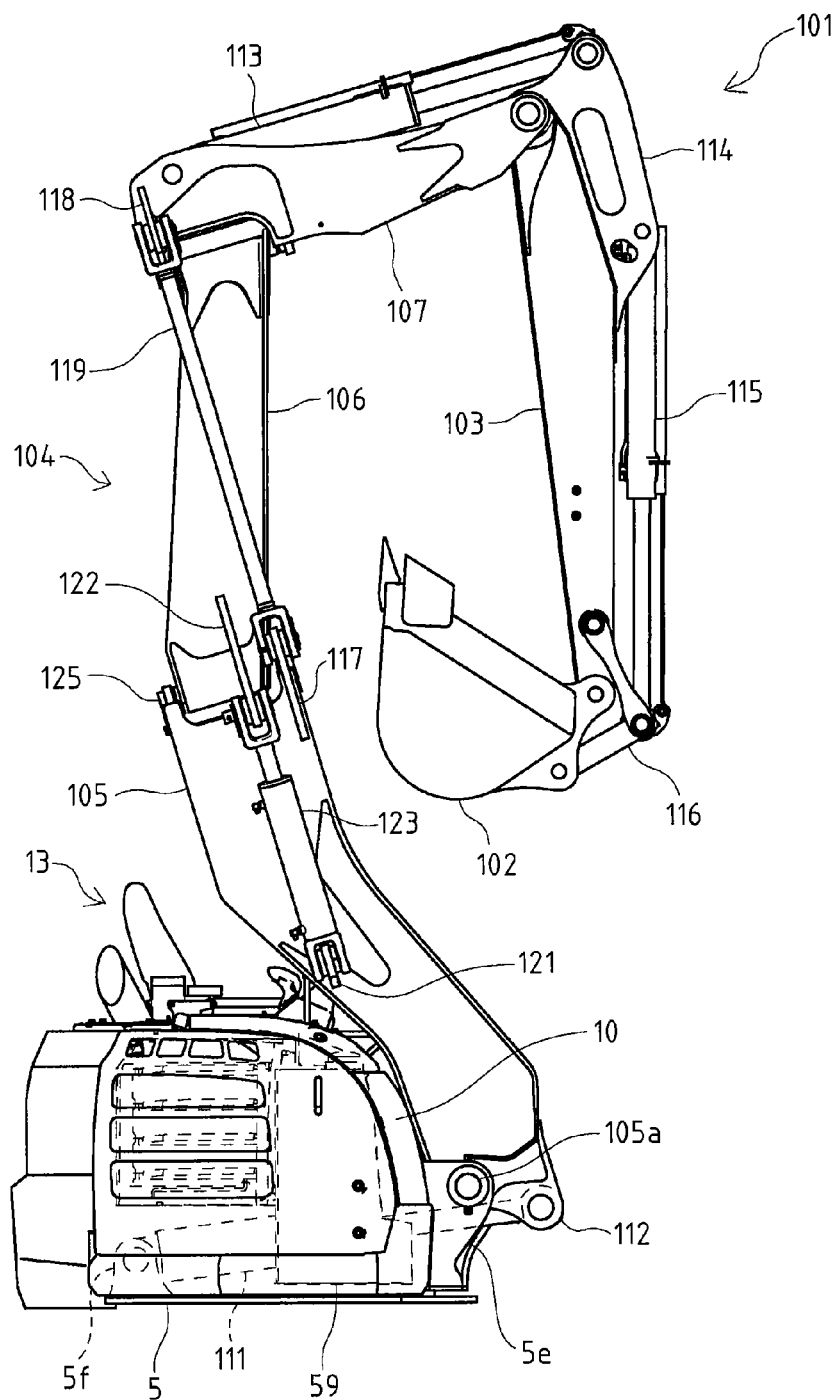
FIG. 23 is a right side view of an upper part of the ultraminiature rotary type rotary working machine.
Figure 24:
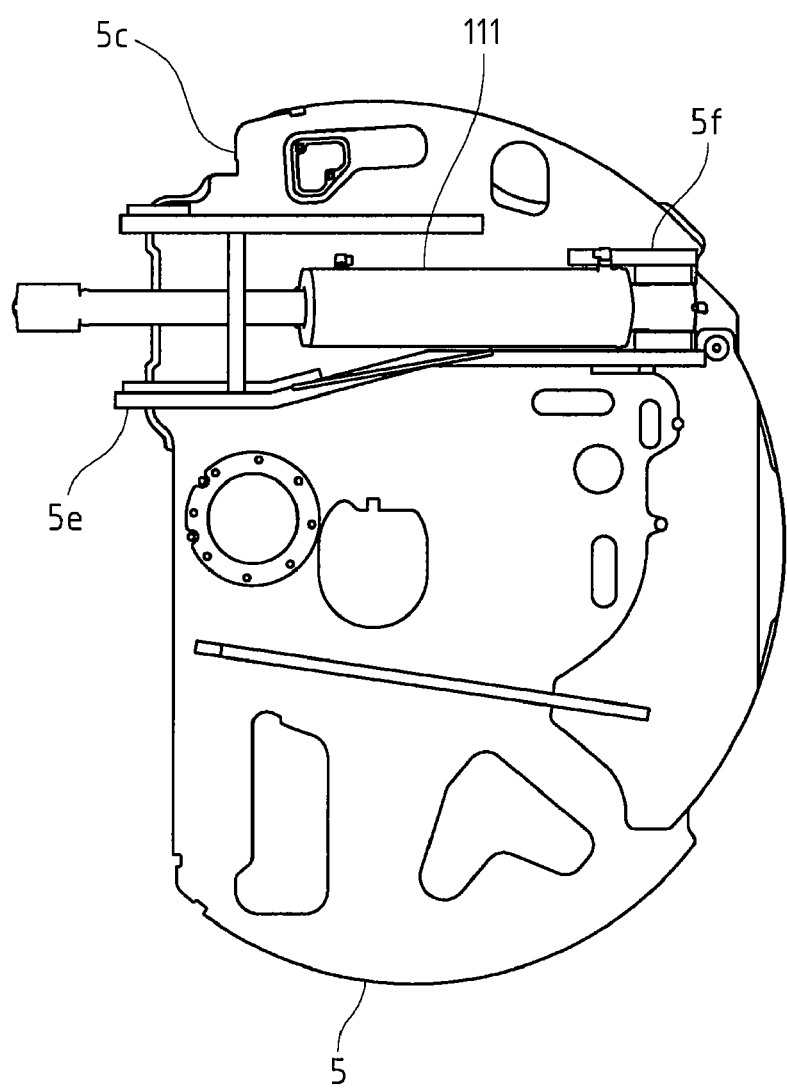
FIG. 24 is a plan view of the rotation table frame.

As shown in FIG. 23 and FIG. 24, when the ultraminiature rotary type rotary working machine is configured using a rotation table frame 5, the working machine 101 is pivotally supported by a pivotally supporting part 5e at the step difference part 5c of the rotation table frame 5 so that the supporting point 105a is positioned within the rotary radius and is arranged closer to the right side with respect to the rotation table frame 5. The space of the drive operation unit 13 arranged on the symmetrically opposite side of the working machine is ensured to be as wide as possible, and the comfortability of the drive operation unit 13 improves.

Figure 25:
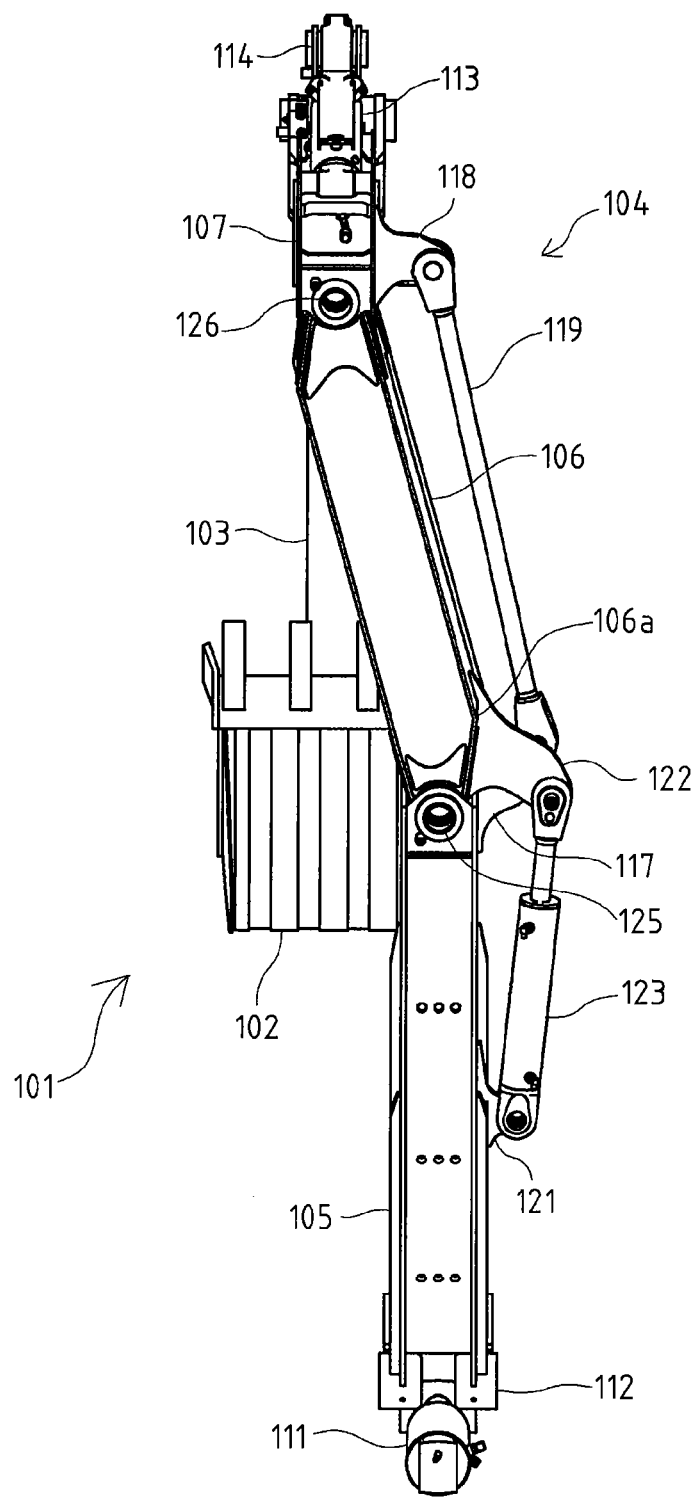
FIG. 25 is a rear view of the offset type working machine.

As shown in FIG. 23 and FIG. 25, the working machine 101 includes a bucket 102, an arm 103, a boom 104, and a hydraulic cylinder for operating the same and is configured as an offset type working machine in which the bucket 102 serving as an attachment is movable in the left and right direction with respect to the boom 104. The boom 104 has, from the basal side, a first boom 105, a second boom 106, and a third boom 107 connected in order towards the distal end side from the main equipment side, where the base part of the first boom 105 is pivotally supported by the pivotally supporting part 5e on the step difference part 5c of the rotation table frame 5 in a manner that allows up and down (front and back) turning, the base part of the second boom 106 is pivotally supported at the distal end of the first boom 105 in a manner that allows left and right turning, and the base part of the third boom 107 is pivotally supported at the distal end of the second boom 106 in a manner that allows left and right turning. The base part of the arm 103 is pivotally supported at the distal end of the boom 104, that is, the distal end of the third boom 107 in a manner that allows up and down turning, and the bucket 102 is pivotally supported at the distal end of the arm 103 in a manner that allows front and back turning.

A boom turning boom cylinder 111 is interposed between the bracket 112 arranged projecting downward from a supporting point 105a at the base part of the first boom 105 and a pivotally supporting part 5f arranged at the rear part of the rotation table frame 5; an arm turning arm cylinder 113 is interposed between the arm bracket 114 arranged projecting upward from the base part of the arm 103 and the base part of the third boom 107; and a bucket turning bucket cylinder 115 is interposed between the link mechanism 116 of the bucket 102 and the arm bracket 114. The boom 104 then can be turned by the extension drive of the boom cylinder 111, the arm 103 can be turned by the extension drive of the arm cylinder 113, and the bucket 102 can be turned by the extension drive of the bucket cylinder 115.

An offset rod 119 is interposed between the bracket 117 arranged projecting to the right side surface on the distal end side of the first boom 105 and the bracket 118 projecting to the right side surface on the base part side of the third boom 107; and an offset cylinder 123 is interposed between the bracket 121 arranged projecting to the right side surface at the middle of the first boom 105 and the bracket 122 arranged projecting to the right side surface of the base part of the second boom 106. In this manner, the second boom 106 turns to the left and the right when the offset cylinder 123 is extension driven; the offset rod 109 also turns to the left and the right in conjunction with the turning of the second boom 106; and the third boom 107, the arm 103, and the bucket 102 arranged at the distal end side of the third boom 107 substantially move parallel (offset movement) to the left and the right without tilting to the left or the right in rear view.

Figure 26:
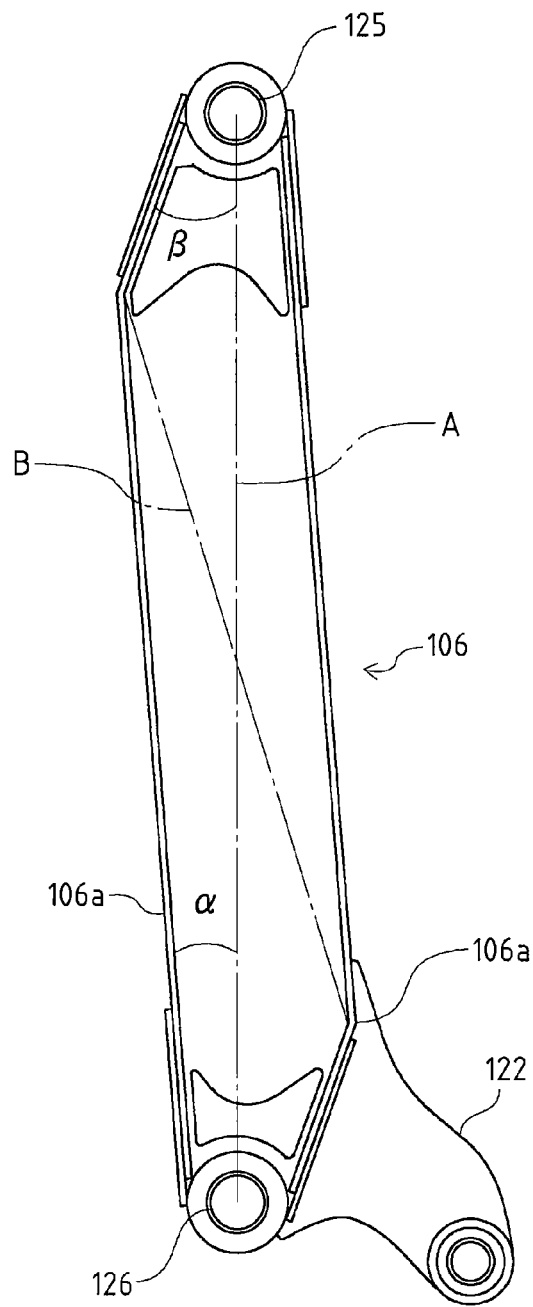
FIG. 26 is a rear view of a second boom.

As shown in FIG. 26, the second boom 106 is formed to a substantially parallelogram shape in rear view with the boom 104 turned to the most rear side, where diagonal line A is arranged in the up and down direction, diagonal line B is arranged slanted to the middle side in the left and right direction of the equipment body, and the first boom 105 and the third boom 107 are respectively pivotally supported by the pivot supporting shaft 125, 126 arranged on both ends of the former diagonal line A. In other words, assuming the second boom 106 has a substantially parallelogram shape, the angle α between the diagonal line A in the front and back direction (up and down direction) and the side 106b of the base part side on the inner side of the equipment body is smaller than the angle β between the diagonal line A and the side 106c of the distal end side on the inner side of the equipment body.

Accordingly, the projection on the inner side of the base part becomes small without lowering the rigidity of the second boom 106 and thus it is less likely to contact the inner side of the distal end part of the first boom 105, and the second boom 106 can be greatly turned to the inner side of the main equipment body. Since the offset amount of the second boom 106 can be increased, the first boom 105 can be arranged on the outer side of the equipment body as much as possible, and the space of the drive operation unit 13 can be enlarged. In this case, since the portion 106a bulging out towards the outer side of the base part side of the second boom 106 is greater than the bulging to the inner side at the same upper and lower positions, the bracket 122 which is the pivotally supporting part of the piston rod of the offset cylinder 123 for turning the second boom 106 can be arranged further projecting to the outer side at the portion 106a projecting to the outer side of the base part side of the second boom 106, and thus the second boom 106 can be greatly turned to the inner side of the main equipment.

Furthermore, the first boom 105 is formed to a substantially S-shape in side view. The first boom 105 is configured such that the bucket 102 enters the space formed on the distal end side and at the same time so that the front part of the bonnet 10 enters the rear space formed on the base part side when the working machine 101 is at the furthest rear position and the bucket 102 is turned to approach the boom 104 through the arm 103. Accordingly, the bucket 102 can be positioned on the main equipment side on the rear side as much as possible without increasing the turning angle to the rear side of the first boom 105, that is, the working machine 101, and the rotary radius can be made small.

As shown in FIG. 23, the boom cylinder 111 for turning the boom 104 is accommodated in the bonnet 10 at the rear side of the step difference part 5c of the rotation table frame Sand is arranged so as to be positioned on the lower side of the step 12 arranged in the drive operation unit 13. The wide space in the bonnet 10 is ensured; the capacity of the fuel tank 59, the reservoir tank 61, and the like to be accommodated in the space can be increased or the space through which the cooling airflow flows can be reliably ensured. Miniaturization and a lighter weight of the working machine 101 can be achieved by arranging the boom cylinder 111 on the main equipment side instead of the working machine 101 side.

In the ultraminiature rotary type rotary working machine including the offset type working machine 101 described above, the boom cylinder 111 is arranged at substantially the same position as the swing cylinder 28 of the rear ultraminiature rotary type rotary working machine on the rotation table frame 5; and the fuel tank 59 and the radiator 40 are arranged lined in the front and the back direction on the upper side of the boom cylinder 111 on the rotation table frame 5 similar to above; and the engine 8 and the reservoir tank 61 are arranged side by side at the side of the radiator 40. Various equipment is thus efficiently arranged on the rotation table frame 5, where the layout is configured to be shared between the rear ultraminiature rotary type and the ultraminiature rotary type rotary working machine.

INDUSTRIAL APPLICABILITY

The rotary working machine of the present invention prevents the cooling airflow from after cooling the engine and the like from blowing against trees positioned to the side of the main equipment and on walkers walking near the side of the main equipment when airflow is being discharged to the side of the main equipment, and thus it is industrially effective.

The invention claimed is:

1. A rotary working machine comprising:
 a bonnet incorporating an engine and an air discharging cooling fan for radiating heat from the engine, wherein the bonnet is formed in a side surface thereof with an opening for discharging a cooling airflow from the cooling fan;
 a duct disposed in the bonnet and interposed between the cooling fan and the opening, wherein a duct is formed with an arc-shaped slot;
 a louver arranged in the duct, the louver including:
  a frame fixed to the duct;
  parallel blades aligned in a vertical row, each of the blades having first and second sides, wherein the first sides of the blades are pivotally connected to the frame so as to be aligned in a vertical row so that the second side of each of the blades is rotatably centered on the first side thereof; and
  a vertical lever which is vertically movable relative to the frame, wherein the second sides of the blades are pivotally connected to the lever so as to be aligned in a vertical row and so as to be vertically movable together with the lever relative to the first sides of the blades while keeping the blades in parallel, and wherein the lever has an upper end portion contacting the duct; and
  a fastener fastening the upper end portion of the lever to the duct via the arc-shaped slot so as to fix the blades at an optional angle, wherein the fastener can be loosened to allow the vertical movement of the lever for changing the angle of the blades.

2. The rotary working machine according to claim 1, wherein the fastener and the upper end portion of the lever are arranged in a vicinity of a cover covering an upper side of the bonnet, and wherein the cover can be opened to open the upper side of the bonnet for access to the fastener.

* * * * *